(12) United States Patent
Aizaki et al.

(10) Patent No.: US 6,917,377 B2
(45) Date of Patent: Jul. 12, 2005

(54) MICROSCOPE SYSTEM

(75) Inventors: Shinichiro Aizaki, Ome (JP); Mitsuhiko Saito, Hachioji (JP); Jitsunari Kojima, Hachioji (JP); Hitoshi Ueda, Hachioji (JP); Hideyuki Masuyama, Hachioji (JP)

(73) Assignee: Olympus Optical Co., Ltd., Tokyo (JP)

( * ) Notice: Subject to any disclaimer, the term of this patent is extended or adjusted under 35 U.S.C. 154(b) by 683 days.

(21) Appl. No.: 09/775,005

(22) Filed: Feb. 1, 2001

(65) Prior Publication Data

US 2003/0016301 A1 Jan. 23, 2003

(30) Foreign Application Priority Data

Feb. 4, 2000 (JP) ........................................ 2000-028323

(51) Int. Cl.⁷ ................................................. H04N 7/18
(52) U.S. Cl. .......................................... 348/79; 382/133
(58) Field of Search ........................ 348/42–76, 78–92; 382/133; 250/201.3, 201.2; 600/476; 73/105; 356/73; H04N 7/18

(56) References Cited

U.S. PATENT DOCUMENTS

| | | | | |
|---|---|---|---|---|
| 4,661,692 A | * | 4/1987 | Kawasaki | 250/201.2 |
| 4,736,241 A | | 4/1988 | Murakami et al. | |
| 5,134,662 A | | 7/1992 | Bacus et al. | |
| 5,481,401 A | | 1/1996 | Kita et al. | |
| 5,548,661 A | | 8/1996 | Price | |
| 5,594,544 A | * | 1/1997 | Horiuchi et al. | 356/73 |
| 5,703,714 A | | 12/1997 | Kojima | |
| 5,732,150 A | * | 3/1998 | Zhou et al. | 382/133 |
| 5,833,617 A | * | 11/1998 | Hayashi | 600/476 |
| 5,859,364 A | * | 1/1999 | Toda et al. | 73/105 |
| 5,933,513 A | | 8/1999 | Yoneyama | |
| 6,337,472 B1 | * | 1/2002 | Garner et al. | 250/201.3 |
| 6,452,625 B1 | * | 9/2002 | Kapitza | 348/80 |
| 2001/0045506 A1 | | 11/2001 | Masuyama | |

FOREIGN PATENT DOCUMENTS

| | | |
|---|---|---|
| JP | 04-328712 | 11/1992 |
| JP | 06-351027 A | 12/1994 |
| JP | 07-199077 A | 8/1995 |
| JP | 08-211295 | 8/1996 |
| JP | 08-237679 A | 9/1996 |
| JP | 08-254657 A | 10/1996 |
| JP | 09-102899 A | 4/1997 |
| JP | 10-307262 | 11/1998 |
| JP | 11-084262 | 3/1999 |
| JP | 2000-083184 | 3/2000 |

OTHER PUBLICATIONS

Co–pending U.S. Appl. No. 09/203,638, filed Dec. 1, 1998, Inventors: Kenji Karaki et al, "Electronic Camera for Microscope".

Co–pending U.S. Appl. No. 09/483,521, filed Jan. 14, 2000, Inventors: Hideyuki Masuyama et al, "Image Sensing Apparatus for Microscope".

U.S. Appl. No. 09/912,899, filed Jul. 25, 2001; Hideyuki Masuyama.

* cited by examiner

*Primary Examiner*—Tung Vo
(74) *Attorney, Agent, or Firm*—Frishauf, Holtz, Goodman & Chick, P.C.

(57) ABSTRACT

A microscope system provided by the present invention in which an electronic camera is used to pick up an observation image by a microscope, comprising a controlling section for setting an image pickup operation of an image pickup element in the electronic camera to an optimum state in accordance with a state of at least one of an optical system combination for a projection magnification of at least an objective lens and a photo eyepiece on a microscope side, an observation method, and lighting conditions.

24 Claims, 14 Drawing Sheets

Gradation
characteristics A

Gradation
characteristics B

Gradation
characteristics C

Gradation
characteristics D

MICROSCOPE SYSTEM

CROSS-REFERENCE TO RELATED APPLICATIONS

This application is based upon and claims the benefit of priority from the prior Japanese Patent Application No. 2000-028323, filed Feb. 4, 2000, the entire contents of which are incorporated herein by reference.

BACKGROUND OF THE INVENTION

The present invention relates to a microscope system in which an electronic camera is used to pick up an observation image by a microscope.

In order to record an observation image by a microscope, a method of photographing the observation image by a camera using a silver salt film has heretofore been used, but in recent years, with enhancement of performance of an electronic camera, a method of picking up the observation image by the electronic camera has frequently been used.

Additionally, when the electronic camera is used to pick up the observation image of the microscope in an optimum state, it is necessary to adjust an electronic camera exposure time, gain, and the like in accordance with optical system magnifications (projection magnification) such as an objective lens magnification, an intermediate magnification change (zoom magnification) and an eyepiece magnification in the microscope, observation system, lighting light brightness, lighting light color temperature and other observation conditions, and installation environment.

In a conventional system, however, an observer has to manually adjust an electronic camera side based on one's sense and experience. Therefore, operation becomes troublesome, and a difference is made in an observation result in accordance with an observer's experience degree. Because of this problem, it is not easy to use the conventional microscope system.

BRIEF SUMMARY OF THE INVENTION

An object of the present invention is to provide a microscope system in which an electronic camera can automatically be set in optimum conditions based on setting of a microscope side and an operation state.

A microscope system provided by the present invention in which an electronic camera is used to pick up an observation image by a microscope, comprising: a controlling section for setting an image pickup operation of an image pickup element in the electronic camera to an optimum state in accordance with a state of at least one of an optical system combination for a projection magnification of at least an objective lens and a photo eyepiece on a microscope side, an observation method, and lighting conditions.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

An embodiment of the present invention will be described hereinafter with reference to the drawings.

Figure 1:
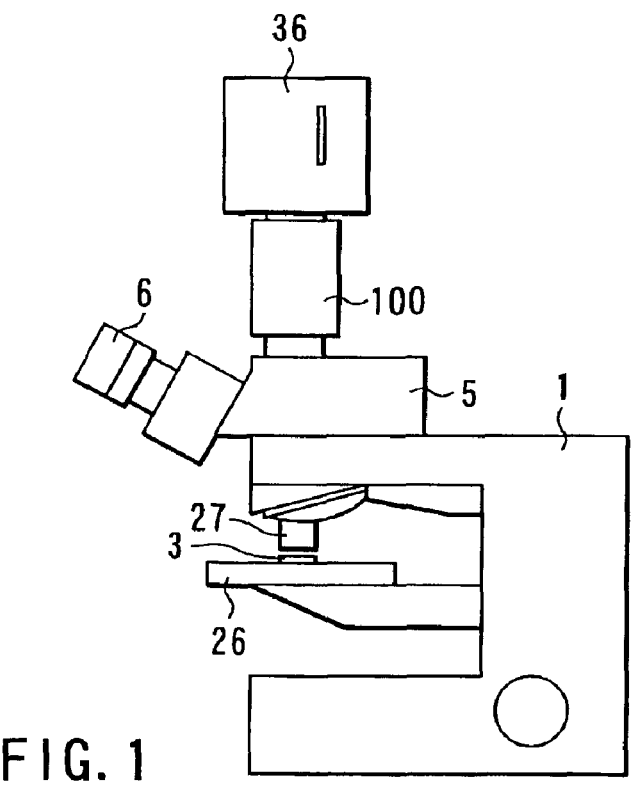
FIG. 1 is a diagram showing a constitution of a microscope system according to an embodiment of the present invention.

FIG. 1 is a diagram showing a constitution of a microscope system according to the embodiment of the present invention. In FIG. 1, in a microscope main body 1, an objective lens 27 is disposed opposite to a sample 3 on a stage 26. Moreover, an eyepiece unit 6 is disposed via a triple lens tube unit 5 along an observation light axis via the objective lens 27, and an electronic camera 36 is disposed via an image forming lens unit 100.

Figure 2:
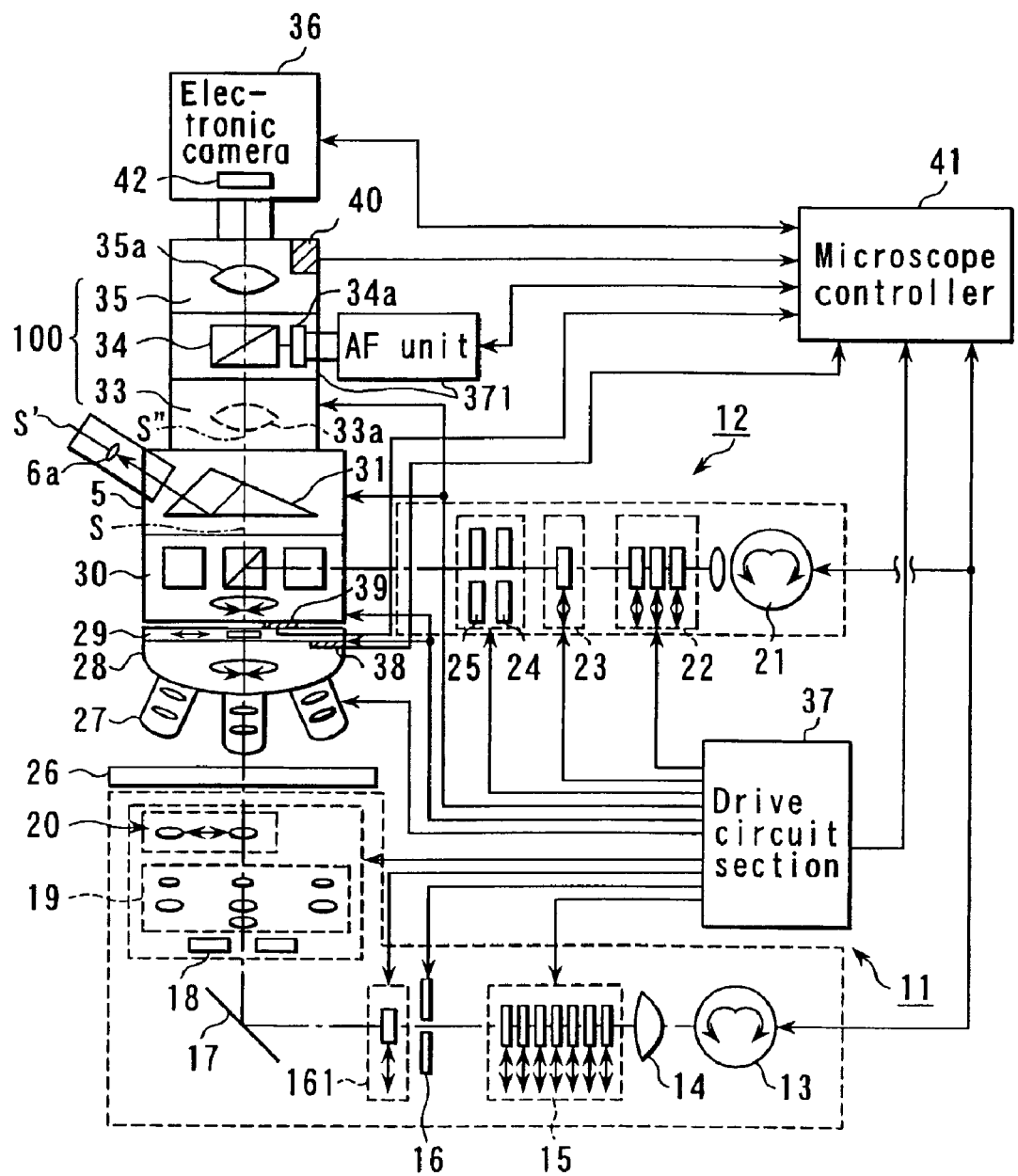
FIG. 2 is a diagram showing a detailed constitution of the microscope system according to the embodiment of the present invention.

FIG. 2 is a diagram showing a detailed constitution of the microscope system. FIG. 2 shows a constitution in which various observation methods such as transmission bright field observation, dark field observation, phase difference observation, differentiating interference observation, and fluorescent observation can appropriately be selected.

The microscope system shown in FIG. 2 is provided with a transmission lighting optical system 11 and a falling lighting (an incident lighting) optical system 12 as lighting systems. The transmission lighting optical system 11 is provided with a transmission lighting light source 13. A collector lens 14 for collecting a transmission lighting light, a transmitting filter unit 15, a transmission field diaphragm 16, a transmission shutter 161, a bent mirror 17, a transmission opening diaphragm 18, a condenser optical element unit 19, and a top lens unit 20 are disposed on a transmission lighting light path emitted from the transmission lighting light source 13. Moreover, the falling lighting optical system 12 is provided with a falling lighting (an incident lighting) light source 21. A falling (an incident) filter unit 22, a falling (an incident) shutter 23, a falling (an incident) field diaphragm 24, and a falling (an incident) opening diaphragm 25 are disposed along a falling lighting (an incident lighting) light path emitted from the falling lighting light source 21.

On an observation light path S on which respective light axes of the transmission lighting optical system 11 and falling lighting optical system 12 are superposed, the sample stage 26 with a specimen as an observation object laid thereon, and a plurality of objective lenses 27 are attached. A revolver 28 for selecting one objective lens 27 by rotating operation and positioning the lens on the observation light path S, an objective lens side optical element unit 29, a cube unit 30 for changing a dichroic mirror on the observation light path S in accordance with various observation methods such as the transmission bright field observation and fluorescent observation, and a beam splitter 31 for splitting the observation light path S into an observation light path S' and an observation light path S" are disposed. The beam splitter 31 is disposed in the triple lens tube unit 5.

An eyepiece 6a is disposed on the observation light path S' bent toward by the beam splitter 31. Furthermore, the image forming lens unit 100 including an intermediate magnification change optical system (zoom lens tube) 33, auto-focus (AF) unit 371 and photo eyepiece unit 35, and the electronic camera 36 are disposed on the observation light path S" passed through the beam splitter 31.

The intermediate magnification change optical system (zoom lens tube) 33 includes a change magnification zoom lens 33a for changing the magnification of the image picked up by the electronic camera 36. Additionally, when the intermediate magnification change is unnecessary, the intermediate magnification change optical system (zoom lens tube) 33 can be removed. An image pickup element 42 is disposed in the electronic camera 36. A light image from the objective lens 27 is formed on an image pickup surface of the image pickup element 42 by a photo eyepiece 35a in the photo eyepiece unit 35.

A beam splitter 34 is disposed in the auto-focus (AF) unit 371, and an AF light receiving element 34a is disposed on the light path split from the observation light path S". The auto-focus unit 371 detects focus based on an output signal from the light receiving element 34a. When an AF function is unnecessary, the unit can be removed.

The transmitting filter unit 15, transmission field diaphragm 16, transmission shutter 161, transmission opening diaphragm 18, condenser optical element unit 19, and top lens unit 20 in the transmission lighting optical system 11, and the falling filter unit 22, falling shutter 23, falling field diaphragm 24, and falling opening diaphragm 25 in the falling lighting optical system 12, the revolver 28, the objective lens side optical element unit 29, the cube unit 30, the beam splitter 31, and the intermediate magnification change optical system (zoom lens tube) 33 are motorized, and driven by respective motors (not shown) in response to respective drive signals from a drive circuit section 37.

On the other hand, an objective lens detector 38 for detecting a type of the objective lens 27 positioned on the observation light path S is disposed in the revolver 28, a retardation adjusting operation detector 39 for detecting a retardation adjusting operation is disposed in the objective lens side optical element unit 29, and a photo eyepiece detector 40 for detecting a type of the eyepiece is disposed in the photo eyepiece unit 35.

A microscope controller 41 controls an operation of the entire microscope, and is connected to the transmission lighting light source 13, falling lighting light source 21, drive circuit section 37, objective lens detector 38, retardation adjusting operation detector 39, photo eyepiece detector 40, and electronic camera 36.

In accordance with an operation of an operating section (not shown) by the observer, the microscope controller 41 adjusts the lights of the transmission lighting light source 13 and falling lighting light source 21, and gives a control instruction to the drive circuit section 37. Furthermore, the microscope controller 41 outputs control state of the transmission lighting light source 13 and falling lighting light source 21, control state of the drive circuit section 37, and further detection information from the objective lens detector 38, retardation adjusting operation detector 39, and photo eyepiece detector 40 to the electronic camera 36, and automatically sets image pickup conditions of the electronic camera 36.

Figure 3:
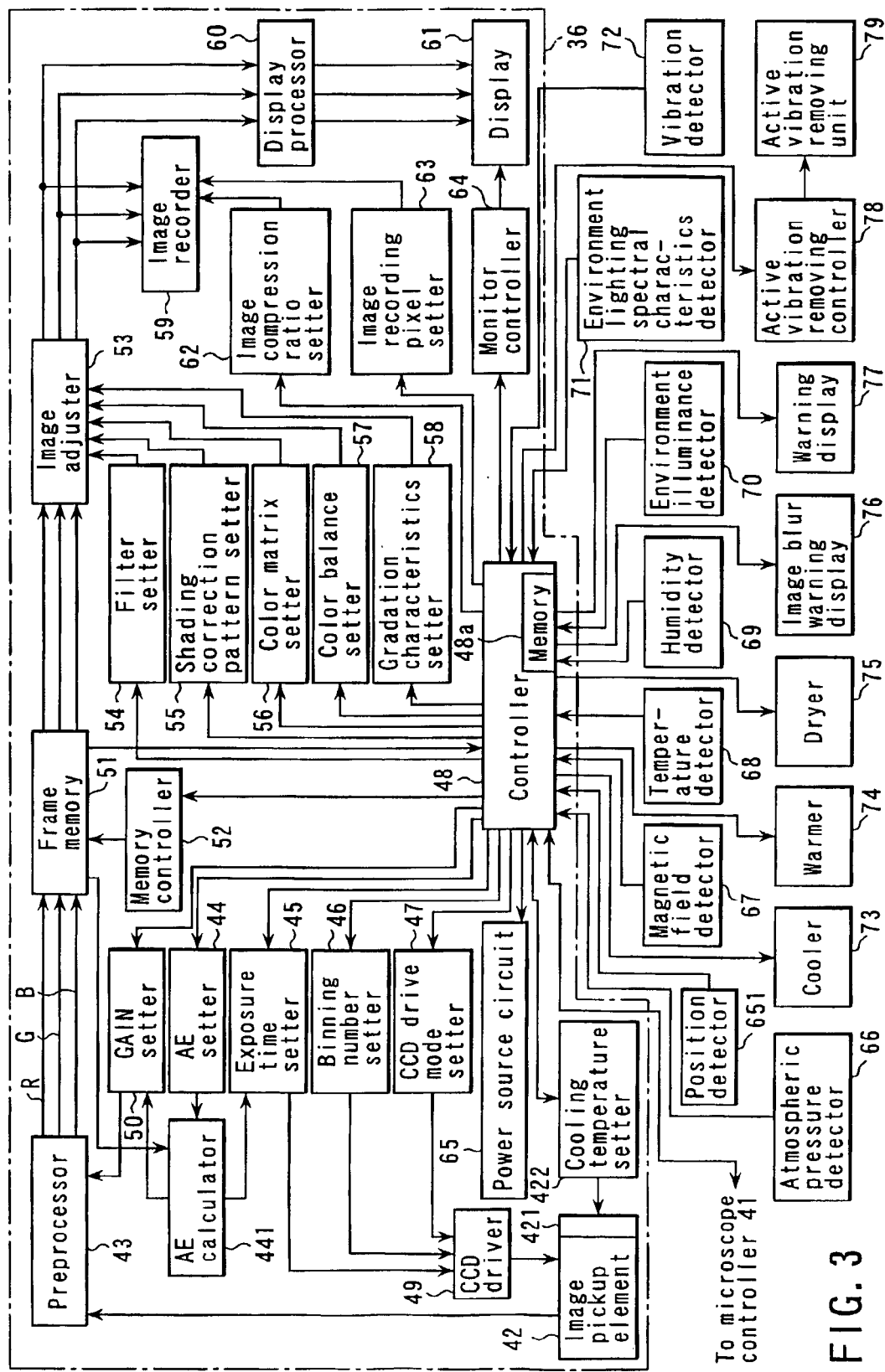
FIG. 3 is a block diagram showing a constitution of an electronic camera for use in the microscope system according to the embodiment of the present invention.

FIG. 3 is a block diagram showing a constitution of the electronic camera for use in the microscope system. In FIG. 3, a part surrounded with a dashed line shows a constitution of the electronic camera 36 in which image pickup conditions are set by the microscope controller 41. In FIG. 3, the image pickup element 42 picks up a color image, and is disposed with the photo eyepiece unit 35 of the microscope on the observation light path S". The image pickup element 42 picks up a specimen observation image enlarged by the microscope and photoelectrically converts the image. An image pickup element cooler 421 is attached to the image pickup element 42. The image pickup element cooler 421 is connected to a controller 48 via a cooling temperature setter 422, and cools the image pickup element 42 at a set temperature of the cooling temperature setter 422 based on an instruction of the controller 48.

An image pickup output of the image pickup element 42 is inputted to a preprocessor 43. The preprocessor 43 has a function of converting an output signal from the image pickup element 42 to an image signal, and separating the image signal into respective color signals of red (R), green (G) and blue (B). The image pickup element 42 is connected to an exposure time setter 45, binning number setter 46, and CCD drive mode setter 47 via a CCD driver 49. These components follows the instruction of the controller 48 to control the image pickup conditions such as exposure time, binning number, and CCD drive mode (e.g., a usual drive mode, and changeover to a high speed drive mode) for the image pickup element 42 via the CCD driver 49.

Figure 4A:
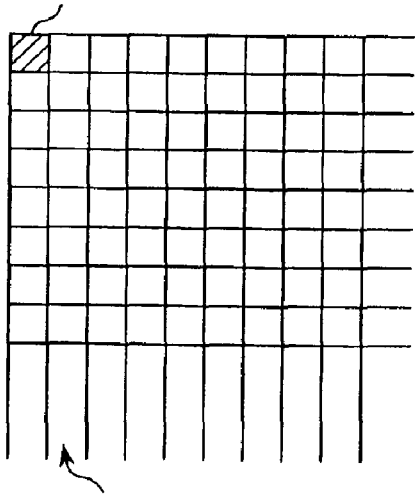
FIGS. 4A, 4B are diagrams showing a binning according to the embodiment of the present invention.
Figure 4B:
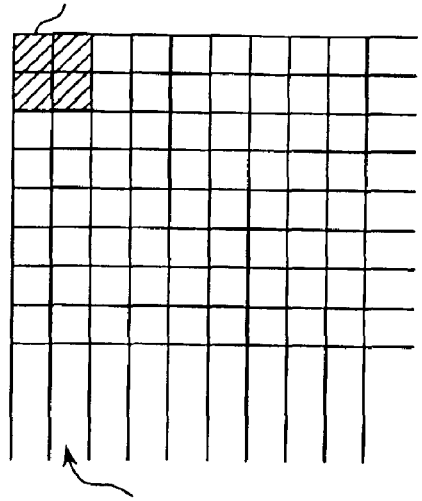

Here, the binning means that when pixels of the image pickup element 42 are shown in FIGS. 4A, 4B, the image is usually picked up by an image pickup unit 401 as shown in FIG. 4A, but the image is picked up by only one reading by an image pickup unit 402 with peripheral pixels added thereto as shown in FIG. 4B. Thereby, a resolution of the image pickup element 42 is lowered, but a signal amount can be increased without increasing a reading noise, and sensitivity is enhanced. A binning number in the present embodiment indicates an added pixel number during binning, and the binning number of FIG. 4B is '2'.

Moreover, a usual drive mode (low speed reading mode) or a high speed reading mode is set in the image pickup element 42 via the CCD drive mode setter 47 in accordance with the instruction of the controller 48. The image pickup element 42 is constituted as a group of matrix light receiving elements. In the high speed reading mode, by means of binning or thinning reading, an image pickup signal is read from the image pickup element, for example, at a ratio of 5 frames/second or more. On the other hand, in the low speed reading mode, the image pickup signal is read from the image pickup element with pixels more than the pixels in the high speed reading mode, a reading speed is slower than the speed of the high speed reading mode, but a high resolution image can be obtained.

Moreover, the preprocessor 43 is connected to a gain setter 50, and the gain setter 50 follows the instruction of the controller 48 to control a gain for the preprocessor 43. The exposure time setter 45 and gain setter 50 are connected to an AE setter 44 via an automatic exposure (AE) calculator 441. The AE setter 44 follows the instruction of the controller 48 to set a target value of the AE calculator 441. The AE calculator 441 compares image data from a frame memory 51 described later with the AE target value, calculates the exposure time and gain, and automatically controls the exposure time setter 45 and gain setter 50. The observer can arbitrarily switch whether the exposure time and gain are directly set by the controller 48 or automatically controlled by the AE calculator 441. Additionally, the controller 48 has a memory 48a in which data necessary for executing various processings is stored.

The respective color signals R, G, B separated by the preprocessor 43 are converted to digital signals, and inputted as digital image data to the frame memory 51. The frame memory 51 stores the image data for one frame of the observation image picked up by the image pickup element 42. The frame memory 51 is connected to a memory controller 52.

The memory controller 52 outputs a control signal for writing the image signal from the preprocessor 43 to the frame memory 51, and a control signal for reading the image data stored in the frame memory 51 to an image adjuster 53 to the frame memory 51 in accordance with the instruction of the controller 48. Observation image data stored in the frame memory 51 is sent to the image adjuster 53 via the memory controller 52.

The image adjuster 53 is connected to a filter setter 54, shading correction pattern setter 55, color matrix setter 56, color balance setter 57, and gradation characteristics setter 58. These components follow the instruction of the controller 48 to control changes of filter setting, shading correction pattern, color matrix, color balance, and gradation characteristics during image adjustment in the image adjuster 53. The shading correction pattern setter 55 is connected to the controller 48. The controller 48 calculates the shading correction pattern from the image data of the frame memory 51, and stores the pattern in the memory 48a. The observation image data subjected to image adjustment by the image adjuster 53 is sent and stored into an image recorder 59, and sent to a display 61 via a display processor 60 so that the image is displayed.

The image recorder 59 is connected to an image compression ratio setter 62 and an image recording pixel number setter 63, and these components follow the instruction of the controller 48 to control changes of a compression ratio and recording pixel number of a recording image. Moreover, for the display 61, display image size and display speed are set by the display processor 60, and the observation image converted to an analog signal is monitored/displayed. The display 61 is further connected to a monitor controller 64, and the monitor controller 64 follows the instruction of the controller 48 to control an on/off state of the monitor display.

On the other hand, the controller 48 is connected to the microscope controller 41, and a power source circuit 65. The power source circuit 65 manages a power source of the entire electronic camera 36, and ON/OFF state is controlled in accordance with the instruction of the controller 48.

Moreover, the controller 48 is connected to a position detector 651 formed of GPS or the like, atmospheric pressure detector 66, magnetic field detector 67, temperature detector 68, humidity detector 69, environment illuminance detector 70, environment lighting spectral characteristics (or color temperature) detector 71, vibration detector 72, and other detectors for various situations around the microscope. The controller 48 is connected to a cooler 73, warmer 74, dryer 75, and other units for changing environment around the microscope, further connected to an image blur warning display 76, warning display 77, and other warning sections, and further connected to an active vibration removing unit 79 via an active vibration removing controller 78. The active vibration removing unit 79 forcibly removes vibration of the microscope, and receives a vibration removing start instruction from the active vibration removing controller 78 to operate when the vibration with a predetermined or more intensity is detected by the vibration detector 72.

An operation of the microscope system comprised as described above will next be described.

In a first embodiment, conditions of an image pickup operation of the image pickup element of the electronic camera is set to be optimum in accordance with the state of a microscope projection magnification or observation method (lighting conditions).

Figure 5:
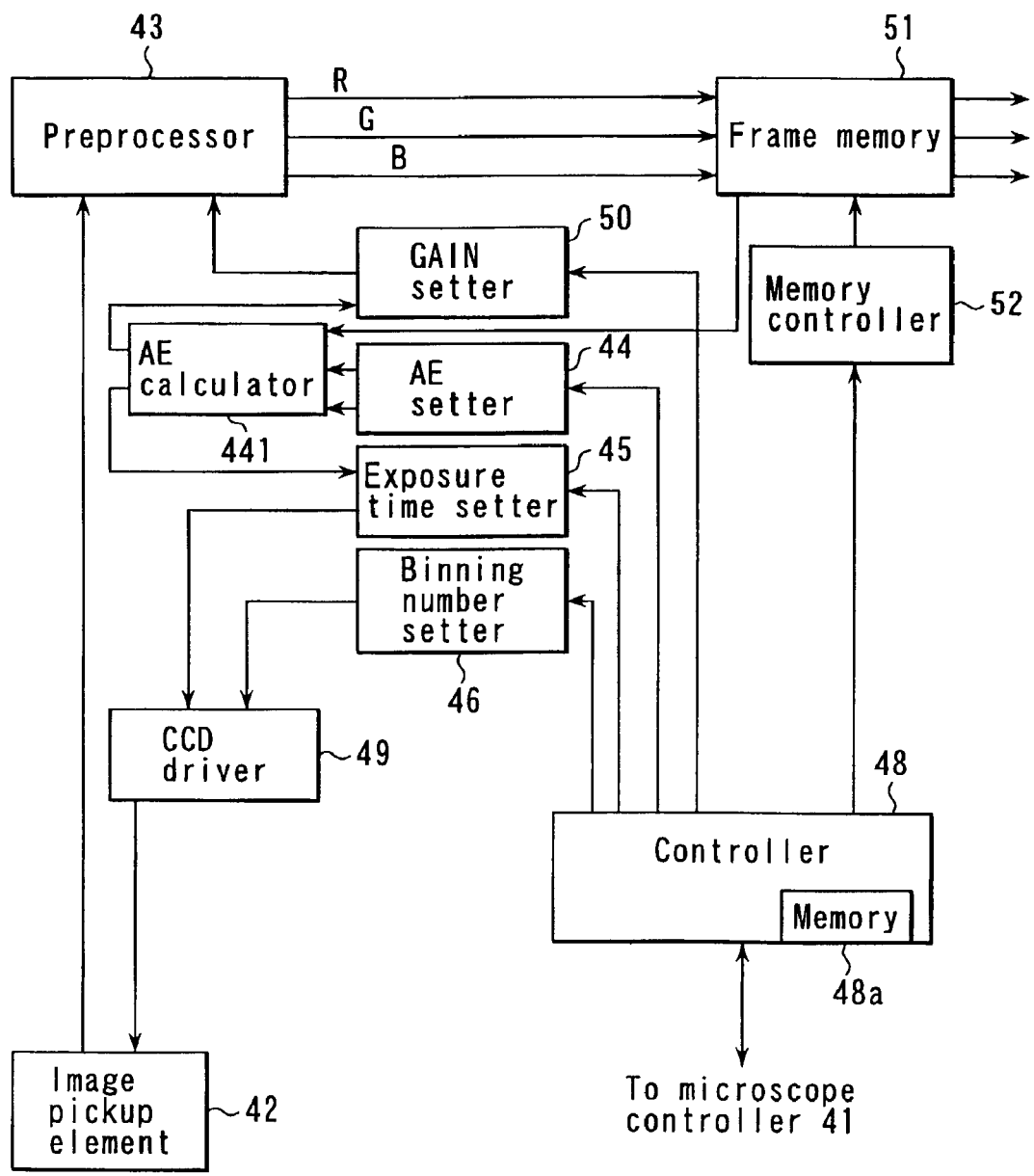
FIG. 5 is a diagram showing a constitution of a microscope and an electronic camera according to the embodiment of the present invention.

FIG. 5 is a diagram showing a constitution of the microscope and electronic camera according to the first embodiment. For the constitution of FIG. 5, a related part is extracted from the constitution shown in FIG. 3. Therefore, description of the constituting part is omitted.

(1) State of Projection Magnification→Setting of binning number: The binning number is set in accordance with the state of the projection magnification.

First, when the observer instructs the microscope controller 41 via an operation section (not shown) to change an optical system magnification (projection magnification), the microscope controller 41 changes the magnification of the objective lens 27, and an intermediate magnification change ratio in the intermediate magnification change optical system 33 in accordance with an instructed content. The following operation is executed from this state.

Figure 6:
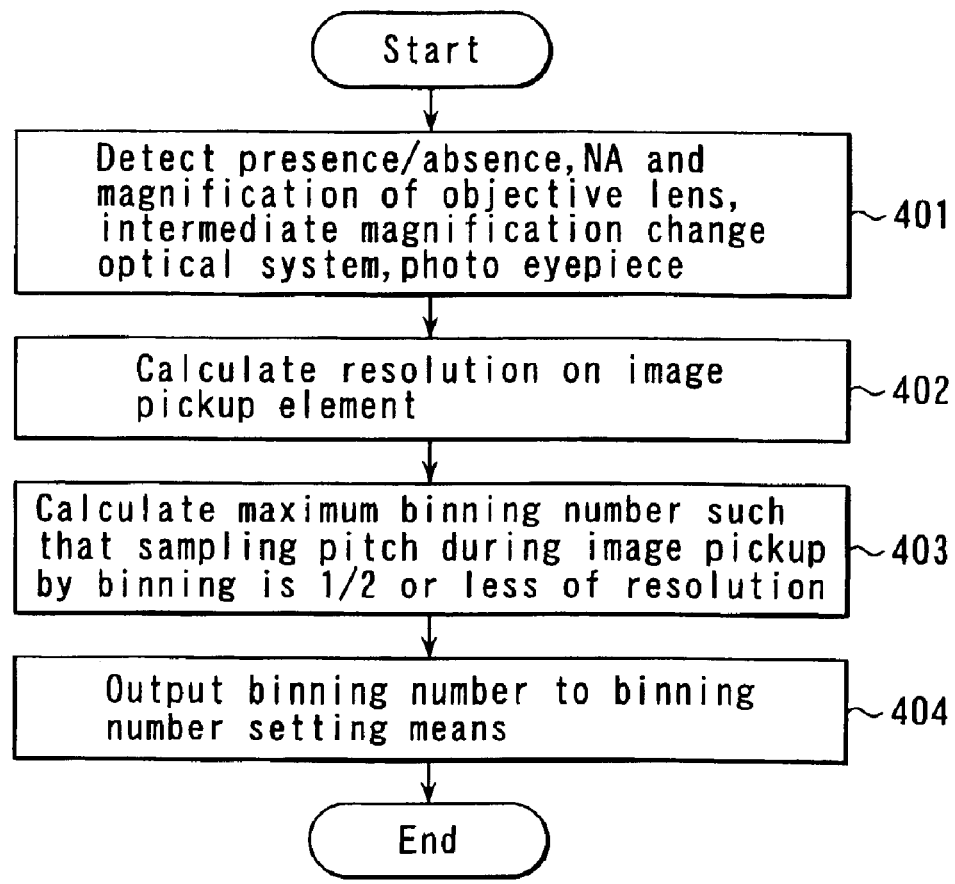
FIG. 6 is a flowchart showing an operation procedure according to the embodiment of the present invention.

FIG. 6 is a flowchart showing an operation procedure according to the first embodiment. First in step 401, the microscope controller 41 detects presence/absence and magnification of the objective lens 27, intermediate magnification change optical system 33, and photo eyepiece unit 35 from information of the objective lens 27 by the objective lens detector 38, information of the intermediate magnification change optical system 33 by the drive circuit section 37, and information of the photo eyepiece unit 35 by the photo eyepiece detector 40. The information detected by the microscope controller 41 is sent to the controller 48 of the electronic camera 36. Additionally, the controller 48 stores a correspondence table of the objective lens and the number of apertures (NA) such as Table 1 in the memory 48a, and obtains the NA of the objective lens from the table.

TABLE 1

Correspondence table of objective lens type and NA

| Objective Lens | 4 Times | 10 Times | 20 Times | 40 Times | 60 Times |
|---|---|---|---|---|---|
| NA | 0.16 | 0.4 | 0.7 | 0.8 | 0.9 |

In step 402, the controller 48 calculates a resolution on the image pickup element 42 from the inputted information. That is, the controller 48 obtains an image forming magnification of the entire optical system from the inputted information of the objective lens 27, zoom magnification of the intermediate magnification change optical system 33, and magnification of the photo eyepiece, and obtains NA of a light incident upon the electronic camera 36 from the image forming magnification and the predetermined NA of the objective lens by the following equation.

$NA$ of incident light=$NA$ of objective lens/image forming magnification of optical system Furthermore, the controller 48 obtains a resolution R on the image pickup element 42 from the obtained NA by the following equation.

$R=0.5\lambda/NA$ of incident light or $0.61\lambda/NA$ of incident light ($\lambda$ denotes one of wavelengths of lights constituting the light image: for example, 0.55 $\mu$m)

Next in step 403, the controller 48 obtains a maximum binning number such that a sampling pitch during image pickup by binning is ½ or less of the resolution R. That is, on the assumption that the binning number is B and element pitch of the image pickup element 42 is p, the controller 48 obtains a maximum integer B of 1 or more which satisfies the following equation.

$B<R/2p$

Next in step 404, the controller 48 outputs the obtained binning number to the binning number setter 46. Thereby, the binning number of the image pickup element 42 driven via the CCD driver 49 is set to an optimum value for the resolution in the projection magnification determined by a combination of the objective lens 27, intermediate magnification change optical system 33, and photo eyepiece unit 35. The image can be picked up with maximum sensitivity and minimum number of pieces of data in a range in which optical information by the microscope is not lacking.

Additionally, the optimum binning number in accordance with conditions such as the objective lens, intermediate magnification and presence/absence of the eyepiece is stored as the following Table 2 in the memory 48a of the controller 48. On receiving a signal from the microscope controller 41, the controller 48 may refer to the table and set to the optimum binning number without executing the step 402.

TABLE 2

Correspondence table of optical system combination and binning number

| Objective Lens (times) | 4 | 4 | 4 | 4 | 10 | ... | 40 | 40 | ... |
|---|---|---|---|---|---|---|---|---|---|
| Intermediate Magnification Change (times) | 1 | 1 | 2 | 2 | 1 | ... | 1 | 1 | ... |
| Eyepiece (times) | 1 | 2 | 1 | 2 | 1 | ... | 1 | 2 | ... |
| Binning Number | 1 | 1 | 1 | 3 | 1 | ... | 2 | 3 | ... |

The following are other examples for obtaining the binning number.

(1) Modification Example 1

The NA is obtained from the correspondence table of the optical system combination and NA, the resolution is obtained from the NA, and the binning number is obtained from a relation between the resolution and the CCD pixel pitch.

In this case, the following Table 3 is stored beforehand in the memory 48a of the controller 48. The controller 48 identifies the optical system combination by the information from the microscope controller 41 as described above, compares the combination with that in the stored table, and obtains NA of the light incident upon the electronic camera corresponding to the optical system combination.

TABLE 3

Correspondence table of optical system combination and NA

| Objective Lens (times) | 4 | 4 | 4 | 4 | 10 | ... | 40 | 40 | ... |
|---|---|---|---|---|---|---|---|---|---|
| Intermediate Magnification Change (times) | 1 | 1 | 2 | 2 | 1 | ... | 1 | 1 | ... |
| Photo Eyepiece (times) | 1 | 2 | 1 | 2 | 1 | ... | 1 | 2 | ... |
| NA | 0.04 | 0.02 | 0.02 | 0.01 | 0.04 | ... | 0.02 | 0.01 | ... |

Subsequently, the controller 48 obtains the resolution R from the NA of the light by the following equation.

$R=0.5\lambda/NA$ of incident light or $0.61\lambda/NA$ of incident light ($\lambda$ denotes one of wavelengths of lights constituting the light image: for example, 0.55 μm)

Furthermore, on the assumption that the binning number is B and the element pitch of the image pickup element 42 is p, the controller 48 obtains the binning number as the maximum integer B of 1 or more which satisfies the following equation.

$B < R/2p$ (2) Modification Example 2

When the image forming optical system of the microscope is constituted of the objective lens 27 and one type of image forming lens, the binning number is obtained from the correspondence table of the objective lens and binning number such as the following Table 4.

In this case, the following Table 4 is stored beforehand in the memory 48a of the controller 48. The controller 48 identifies the objective lens by the information from the microscope controller 41 as described above, compares the lens with that in the stored table and obtains the binning number.

TABLE 4

Correspondence table of objective lens type and binning number

| Objective Lens | 4 Times | 10 Times | 20 Times | 40 Times | 60 Times |
|---|---|---|---|---|---|
| Binning Number | 1 | 1 | 1 | 2 | 2 |

(3) Modification Example 3

When the image forming optical system of the microscope is constituted of the objective lens 27 and one type of image forming lens, the NA is obtained from the correspondence table of the objective lens and NA, the resolution is further obtained from the NA, and the binning number is obtained from the relation between the resolution and the CCD pixel pitch.

In this case, the correspondence table of the objective lens and NA on the image pickup element like the following Table 5 is stored beforehand in the memory 48a of the controller 48. The controller 48 identifies the objective lens for use by the information from the microscope controller 41 as described above, and obtains the NA of the light on the image pickup element 42 for the objective lens.

TABLE 5

Correspondence table of objective lens type and NA

| Objective Lens | 4 Times | 10 Times | 20 Times | 40 Times | 60 Times |
|---|---|---|---|---|---|
| NA | 0.04 | 0.04 | 0.035 | 0.02 | 0.015 |

Furthermore, the controller 48 obtains the resolution from the NA of the light by the following equation.

$R=0.5\lambda/NA$ of incident light or $0.61\lambda/NA$ of incident light ($\lambda$ denotes one of wavelengths of lights constituting the light image: for example, 0.55 μm)

Additionally, on the assumption that the binning number is B and the element pitch of the image pickup element 42 is p, the controller 48 obtains the binning number as the maximum integer B of 1 or more which satisfies the following equation.

$B < R/2p$ (2) State of Observation Method→Setting of AE Calculation Mode: AE calculation mode is set in accordance with the state of the observation method.

When the observer operates the operating section (not shown) to instruct the microscope controller 41 to select microscopy, that is, observation methods such as transmission bright field observation, dark field observation, phase difference observation, differentiating interference observation, and fluorescent observation, the microscope controller 41 instructs the drive circuit section 37 to select the transmission lighting optical system 11 or the falling lighting optical system 12, and further to switch the transmitting filter unit 15, transmission field diaphragm 16, mirror 17, transmission opening diaphragm 18, condenser optical element unit 19, top lens unit 20, falling filter unit 22, falling shutter 23, falling field diaphragm 24, falling opening diaphragm 25, revolver 28, objective lens side optical element unit 29, cube unit 30, and the like in accordance with the observation methods. The following operation is executed from this state.

Figure 7:
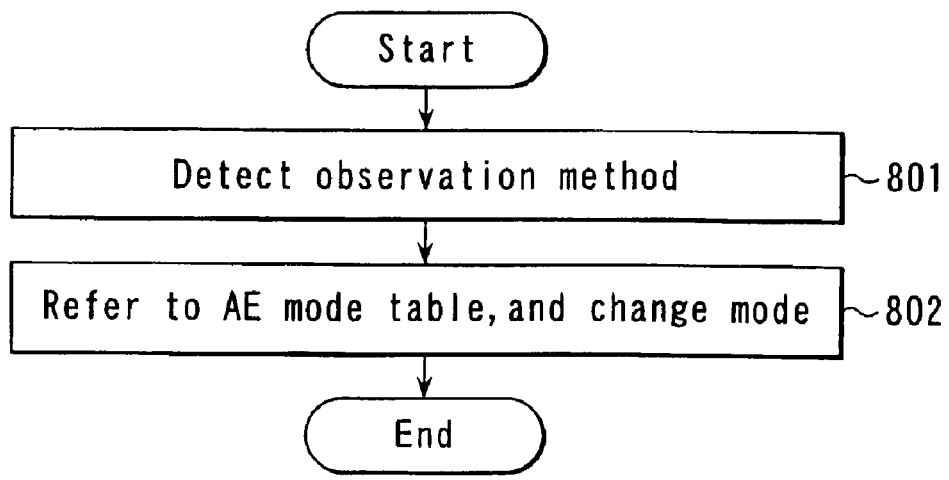
FIG. 7 is a flowchart showing the operation procedure according to the embodiment of the present invention.

FIG. 7 is a flowchart showing the operation procedure according to the first embodiment. First in step 801, the microscope controller 41 sends the information of the observation method to the controller 48 of the electronic camera 36. In step 802, the controller 48 refers to the inputted information and uses an AE calculation mode table by observation method stored beforehand in the memory 48a to switch the following mode.

In this case, an exposure calculation mode is written for each observation method in the AE calculation mode table by observation method like the following Table 6.

TABLE 6

AE calculation mode table by observation method

| | Transmission Observation Method | | | | Falling Observation Method | | |
|---|---|---|---|---|---|---|---|
| Observation Method | Bright Field | Dark Field | Diff. Int. | Phase Diff. | Bright Field | Dark Field | Fluo. |
| Exposure Calculation Mode | AUTO | FL-AUTO | AUTO | AUTO | AUTO | FL-AUTO | SFL-AUTO |

In Table 6, "AUTO" mode is a calculation mode based on a usual bright field specimen, and a calculation mode suitable for photometry of the specimen with a relatively light specimen background, such as bright field, differentiating interference, and phase difference. Moreover, "FL-AUTO" mode is a calculation mode using a specimen darker than the light field specimen as a target, and a calculation mode suitable for falling (incident) fluorescent observation, and dark field observation. Furthermore, "SFL-AUTO" mode is a calculation mode most suitable for the falling fluorescent observation, and a mode for judging and calculating distribution and intensity of fluorescent color development.

Additionally, the AE calculation mode table by observation method can be renewed if necessary, and can be selected in a calculation mode setting screen (not shown). Moreover, the observer can change the table as desired. When the table is changed, calculation mode data of the observation method can be renewed.

The controller 48 sets the calculation mode obtained in this manner to the AE calculator 441 via the AE setter 44, and the AE calculator 441 obtains the exposure time and gain optimum for the observation method, and outputs the exposure time and gain to the exposure time setter 45 and gain setter 50, respectively. Thereby, the exposure time of the image pickup element 42 driven via the CCD driver 49 is changed to the exposure time set by the exposure time setter 45, and the gain of the preprocessor 43 is changed to the gain set by the gain setter 53.

As described above, the binning number, AE calculation mode, exposure time, gain, and the like are set as described in the above (1) and (2), but can also be adjusted in the following methods (3) and (4).

(3) Lighting Condition (Brightness)→Setting of Binning Number, Exposure Time, and Gain When brightness of the lighting light in the transmission lighting optical system 11 or the falling lighting optical system 12 changes, a type, number, and other information of various filters such as an ND filter to be inserted on the light path and a color temperature conversion filter are detected from lighting voltages for the transmission lighting light source 13 and falling lighting light source 21, and drive content of the drive circuit 37 in the microscope controller 41. Then, the information is sent to the controller 48 of the electronic camera 36 from the microscope controller 41.

The controller 48 obtains the binning number optimum for the brightness of the lighting light from the inputted information, and outputs the binning number to the binning number setter 46. Thereby, the binning number is changed to be suitable for the lighting light brightness set by the CCD driver 49, and a dynamic image can be displayed in a fastest image rewriting cycle for the changed lighting light brightness.

Similarly, when the lighting voltage and filter information from the microscope controller 41 are inputted to the controller 48, the controller 48 obtains the exposure time and gain optimum for the lighting light brightness from the inputted information, and outputs the exposure time and gain to the exposure time setter 45 and gain setter 50. Thereby, the exposure time of the image pickup element 42 driven by the CCD driver 49 is set to the exposure time suitable for the lighting light brightness, and the gain of the preprocessor 43 is also changed to be suitable for the lighting light brightness set by the gain setter 50. An AE start value corresponding to the lighting light brightness is set, and most efficient AE control can be performed.

(4) State of Projection Magnification→Setting of Exposure Time, and Gain

When the microscope controller 41 inputs the projection magnification by the combination of the objective lens 27, intermediate magnification change optical system 33, and photo eyepiece unit 35 to the controller 48, the controller 48 obtains the exposure time and gain optimum for the optical system projection magnification from the inputted information, and outputs the exposure time and gain to the exposure time setter 45 and gain setter 50, respectively. Thereby, the exposure time of the image pickup element 42 driven by the CCD driver 49 is set to be suitable for projection magnification change set by the exposure time setter 45, and the gain of the preprocessor 43 can also be changed to be suitable for the projection magnification change set by the gain setter 50.

As described above, according to the first embodiment, the image pickup operation state of the electronic camera can be controlled to be optimum in accordance with the projection magnification determined by the type of the microscope objective lens, and the like. Therefore, even if the observer is not skilled in handling the electronic camera, the observation image by the microscope can constantly be picked up in a optimum state.

In a second embodiment, conditions of image quality adjustment of image data read from the image pickup element of the electronic camera are set to be optimum in accordance with any state of the microscope projection magnification, observation method, and lighting conditions.

Figure 8:
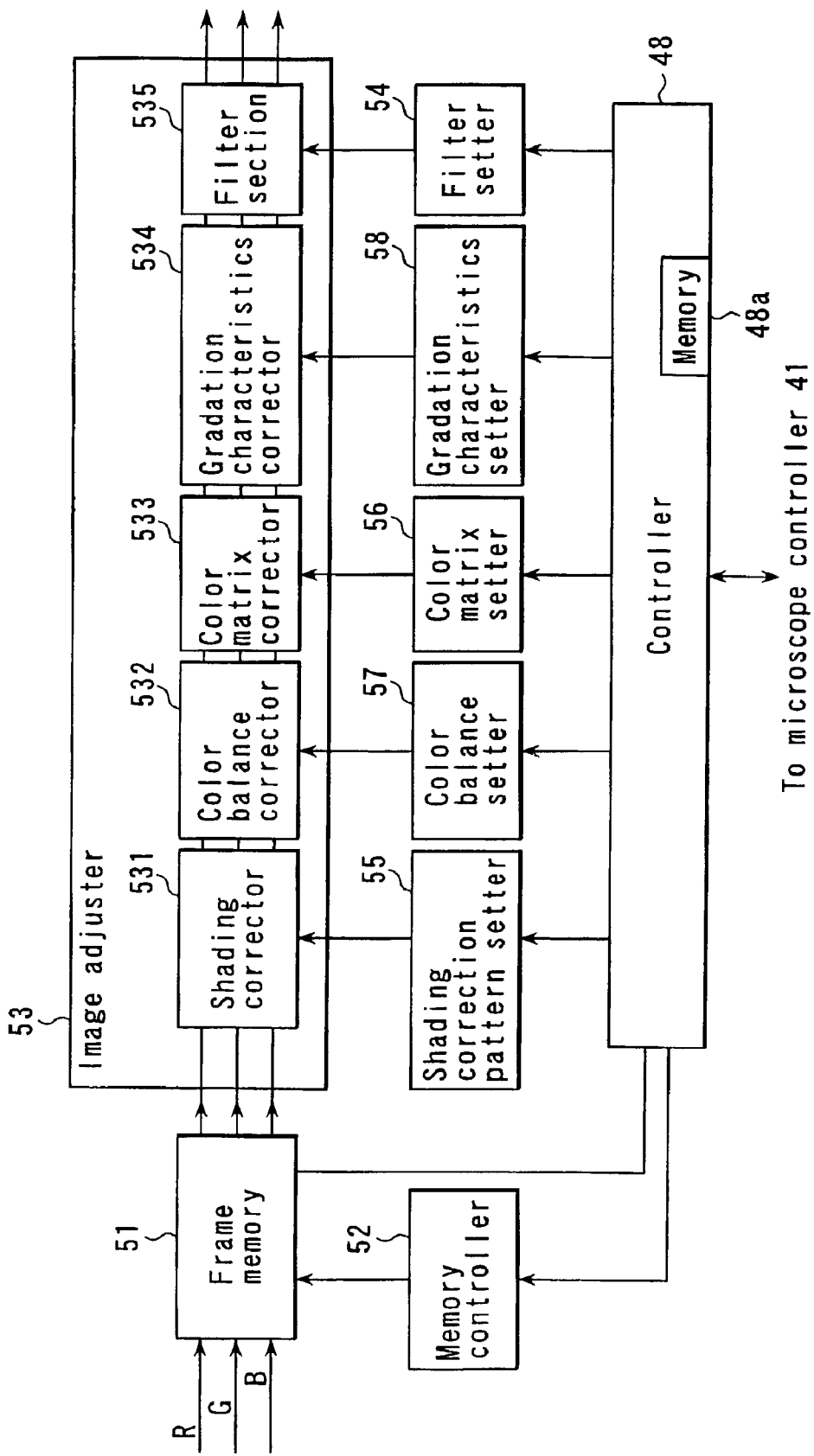
FIG. 8 is a diagram showing a constitution of the microscope and electronic camera according to the embodiment of the present invention.

FIG. 8 is a diagram showing a constitution of the microscope and electronic camera according to the second embodiment. Since FIG. 8 shows a related part extracted from the constitution shown in FIG. 3 in detail, description of the same components as those of FIG. 3 is omitted.

The image adjuster 53 is constituted of a shading corrector 531, color balance corrector 532, color matrix corrector 533, gradation characteristics corrector 534, and filter section 535. The image data sent from the frame memory 51 is sent to the image adjuster 53, and first subjected to shading correction by the shading corrector 531. The shading correction will be described hereinafter in detail.

Figures 9A, 9B:
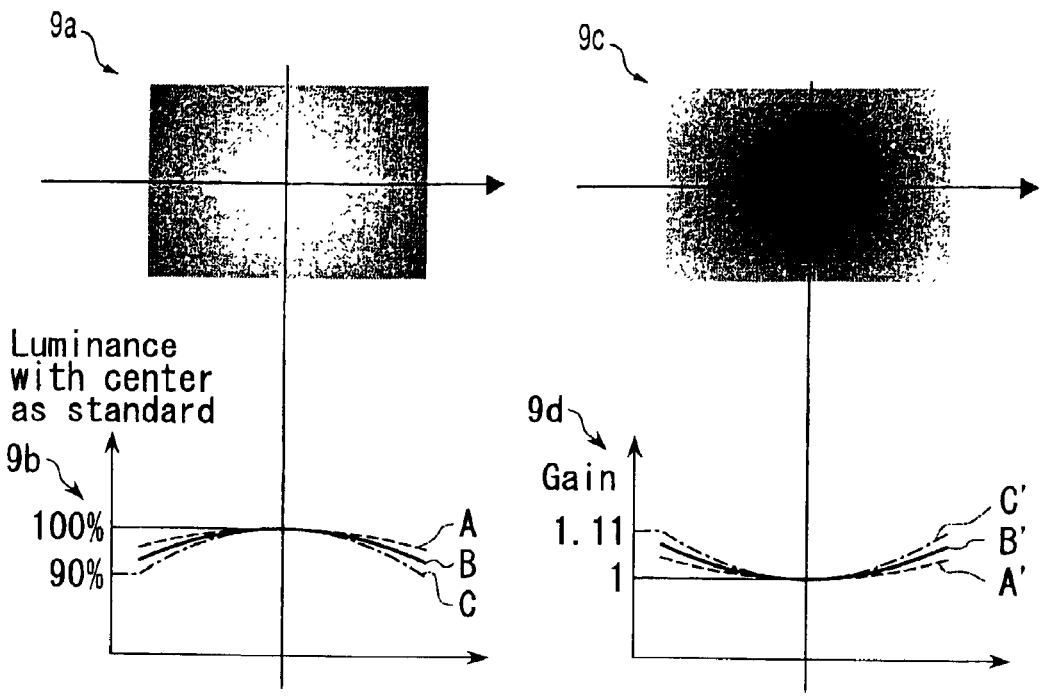
FIGS. 9A, 9B are diagrams showing shading correction according to the embodiment of the present invention.

FIGS. 9A, 9B are diagrams showing the shading correction. When a specimen light image by the objective lens 27 and image forming lens unit 100 is picked up by the image pickup element 42, shading occurs in which an image center portion is lightened and peripheral portion is darkened. For example, when an image is picked up by transmission lighting without disposing any specimen, the image is picked up as shown by 9a of FIG. 9A. Moreover, a luminance distribution along a center line of the picked up image is obtained as shown by 9b of FIG. 9A. A shading amount differs with objective lens types A, B, C. The shading is corrected based on a shading correction pattern as shown by 9c of FIG. 9B.

For example, with an objective lens C, when the brightness of the center portion of the image is 100%, the brightness of the peripheral portion of the image is 90% because of the shading. As shown by 9d of FIG. 9B, in a shading correction pattern C' corresponding to the objective lens C, the image center portion has a gain of 1, and the image peripheral portion has a gain of 1.11. When the shading is corrected using the shading correction pattern, the original image is multiplied by gain 1 in the center portion, and by gain 1.11 in the peripheral portion. The brightness of the peripheral portion of the original image is 90% of the brightness of the center portion. Therefore, when the image is multiplied by gain 1.11, the brightness becomes the same as that of the center portion, that is, 100%. When the gain is similarly adjusted by the shading correction pattern in each position on the image, the image is subjected to the shading correction. For example, when only the image of lighting is picked up, the image becomes uniform in the entire surface.

The shading corrector 531 for performing the aforementioned shading correction is connected to the shading correction pattern setter 55, and the shading correction is performed based on the shading correction pattern set by the shading correction pattern setter 55.

Subsequently, the image pattern subjected to the shading correction is subjected to color balance correction by the color balance corrector 532. For the image picked up by the image pickup element 42, when only the lighting image is picked up, image color differs according to color temperature of the lighting light. That is, when the color temperature is low, a reddish image is picked up. When the color temperature is high, a bluish image is picked up. To eliminate such color difference, R data and B data of the image data are multiplied by an appropriate coefficient by the color balance corrector 532. The color balance corrector 532 is connected to the color balance setter 57, and the color balance setter 57 sets the coefficient by which the R and B data are multiplied.

Subsequently, the image data subjected to the color balance correction is subjected to color correction by the color matrix corrector 533, and RGB signal of the image picked up by the image pickup element 42 is converted to the image data whose color reproducibility is visually enhanced. On the assumption that signals of the image data before and after the conversion are R1, G1, B1, and R2, G2, B2, respectively, the color matrix corrector 533 performs the conversion by the following equation (1).

$$\begin{pmatrix} R2 \\ G2 \\ B2 \end{pmatrix} = \begin{pmatrix} a11 & b12 & c13 \\ a21 & b22 & c23 \\ a31 & b32 & c33 \end{pmatrix} \cdot \begin{pmatrix} R1 \\ G1 \\ B1 \end{pmatrix} \quad (1)$$

The color matrix corrector 533 is connected to the color matrix setter 56, and the color matrix setter 56 sets conversion matrix of the above equation (1).

Subsequently, the image data subjected to the color correction is subjected to gradation characteristics correction by the gradation characteristics corrector 534. In the gradation characteristics correction, respective R2, G2, B2 data are converted to respective R3, G3, B3 data by input/output characteristics LUT shown in FIG. 10A. The gradation characteristics corrector 534 is connected to the gradation characteristics setter 58, and the gradation characteristics setter 58 sets input/output characteristics LUT.

Subsequently, the image data subjected to the gradation characteristics correction is filtered by the filter section 535. The filter section 535 is connected to the filter setter 54, and the filter setter 54 sets a filter for filtering the image. As the filter for use herein, a low pass filter, edge emphasized filter, smoothing filter, and the like can be selected. The filtered image data is sent to the display processor 60 and image recorder 59.

(1) Change of Projection Magnification→Setting of Shading Correction Pattern

First the controller 48 obtains the shading correction pattern in the respective conditions such as the optical system combination and observation method during setup of the microscope or the like, and stores the pattern beforehand in the memory 48a. A setting procedure is executed as shown in flowcharts of FIGS. 11A and 11B.

Figure 11A:
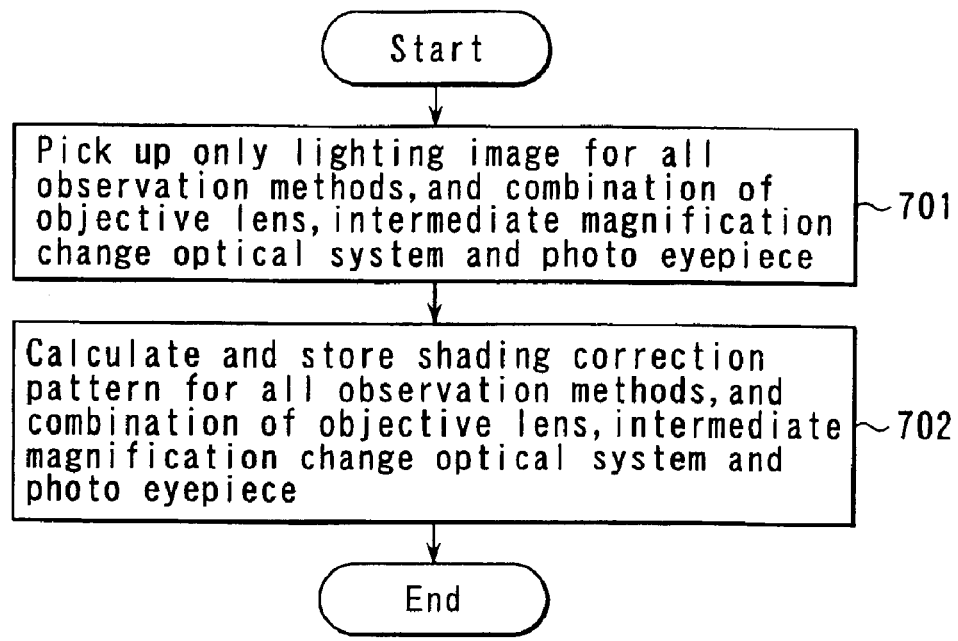
FIGS. 11A, 11B are flowcharts showing the operation procedure according to the embodiment of the present invention.
Figure 11B:
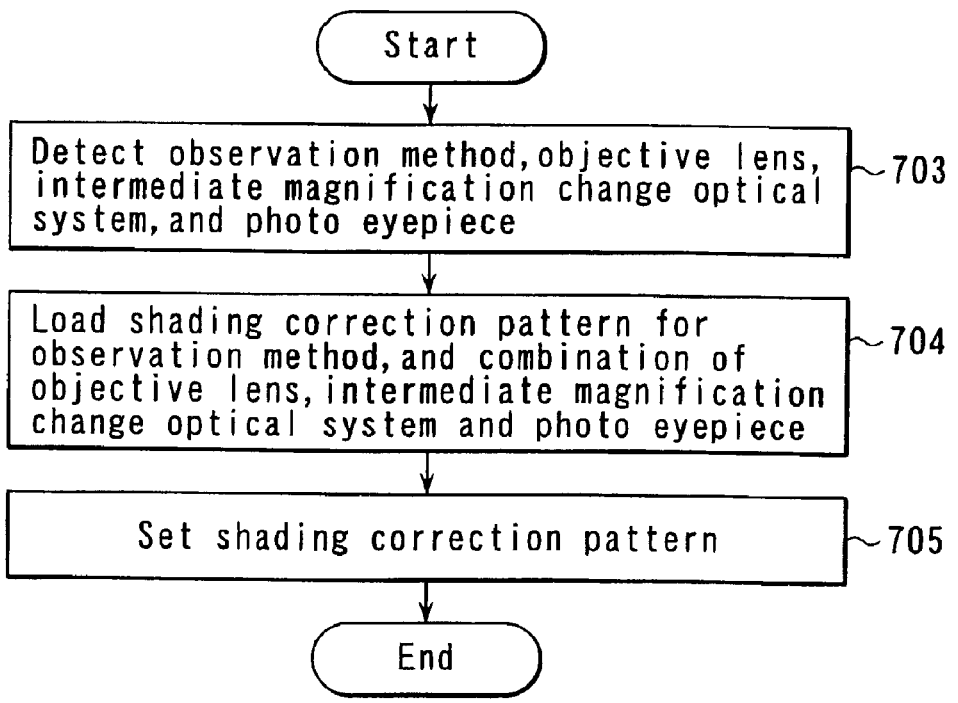

FIGS. 11A, 11B are flowcharts showing the operation procedure according to the second embodiment. First in step 701 of FIG. 11A, the image 9a of FIG. 9A only by lighting is picked up in all observation methods, and the combination of the objective lens 27, intermediate magnification change optical system 33 and photo eyepiece unit 35. Subsequently in step 702, the controller 48 calculates the shading correction pattern by all the observation methods, and combination of the objective lens 27, intermediate magnification change optical system 33 and photo eyepiece unit 35 as shown by 9c of FIG. 9B, and stores the pattern in the memory 48a.

Moreover, during actual observation, when the objective lens 27 or the intermediate change magnification of the intermediate magnification change optical system 33 is changed via the microscope controller 41 according to the observer's instruction, in step 703 of FIG. 11B, the controller 48 detects the observation method, objective lens 27, intermediate magnification change optical system 33, and photo eyepiece unit 35. In step 704, the controller loads the shading correction pattern shown by 9c of FIG. 9B from the memory 48a for the observation method, and the combination of the objective lens 27, intermediate magnification change optical system 33, and photo eyepiece unit 35. In step 705, the controller outputs the shading correction pattern to the shading correction pattern setter 55. Thereby, the image adjuster 53 performs the shading correction as set by the shading correction pattern setter 55.

A zoom optical system in which the magnification continuously changes in the intermediate magnification change optical system will next be described. In this case, in a method similar to the aforementioned method, the controller 48 calculates the shading correction pattern in the conditions such as all optical system combinations and observation methods or the like when the magnification of the intermediate magnification change optical system 33 is one time. The controller stores the calculated pattern in the memory 48a.

During actual observation, when the objective lens 27 or a zoom magnification of the intermediate magnification change optical system 33 is changed via the microscope controller 41 according to the observer's instruction, the microscope controller 41 detects the optical system combination, the observation method, and the zoom magnification of the intermediate magnification change optical system 33, and sends the information to the controller 48. The controller 48 selects the shading correction pattern for the optical system combination and observation method from the memory 48a, and further adjusts the pattern by the zoom magnification. The adjustment is performed as follows.

Figure 12:
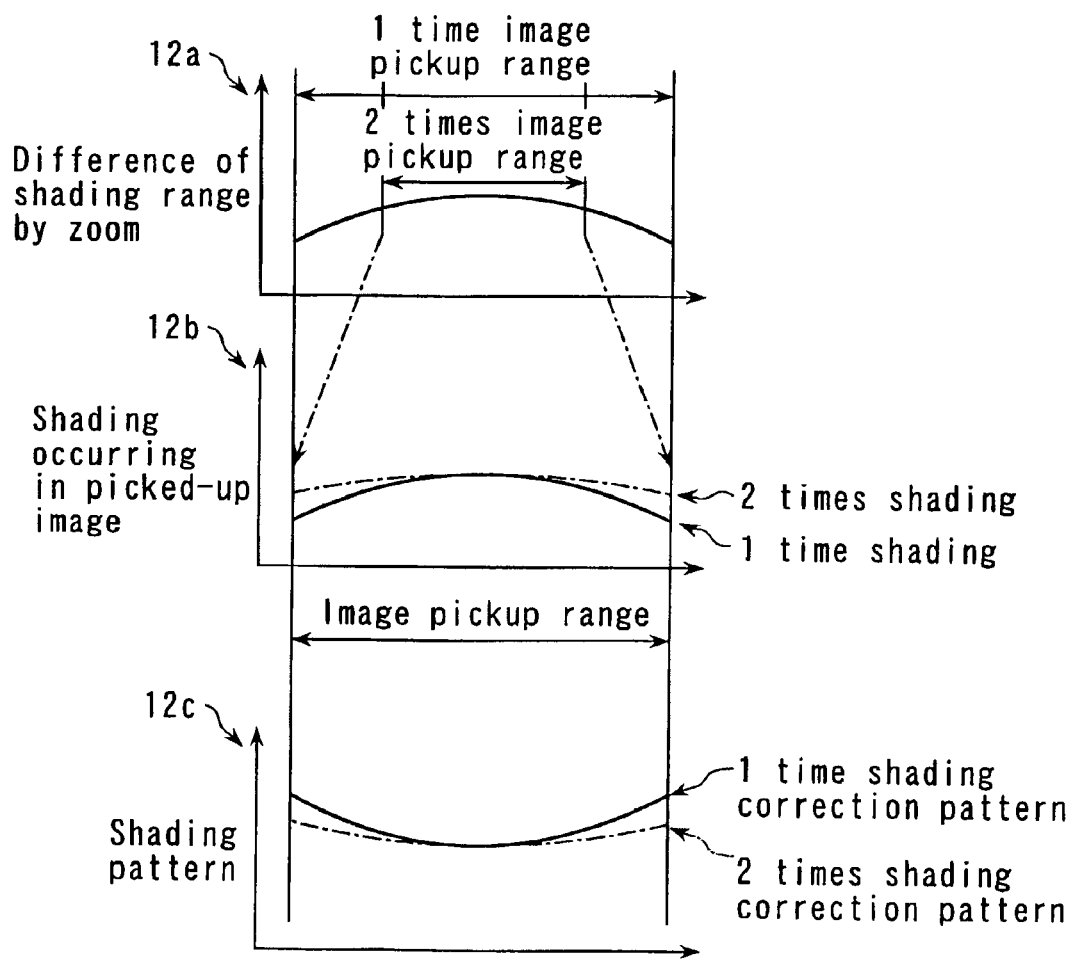
FIG. 12 is a diagram showing a shading change by an intermediate magnification change optical system according to the embodiment of the present invention.

FIG. 12 is a diagram showing a shading change by the intermediate magnification change optical system 33, and shows a case in which the zoom magnification of the intermediate magnification change optical system 33 changes to 2 times from 1 time. When the zoom magnification of the intermediate magnification change optical system 33 changes to 2 times from 1 time, even with the shading for the same objective lens, a range picked up by CCD changes as shown by 12a, and the shading occurs as a result of image pickup as shown by 12b. Therefore, the shading correction pattern for correcting the shading when the zoom magnification of the intermediate magnification change optical system 33 changes is obtained as shown by 12c.

That is, with respect to the shading correction pattern of a point at which the magnification of the intermediate magnification change optical system 33 is 1 time, the shading correction pattern of a point at which the zoom magnification changes is adjusted so as to cut out only an image pickup range as a pattern whose size changes by the zoom magnification (twice the size in this case). The shading correction is performed by the shading correction pattern adjusted in this manner.

Figures 10A, 10B:
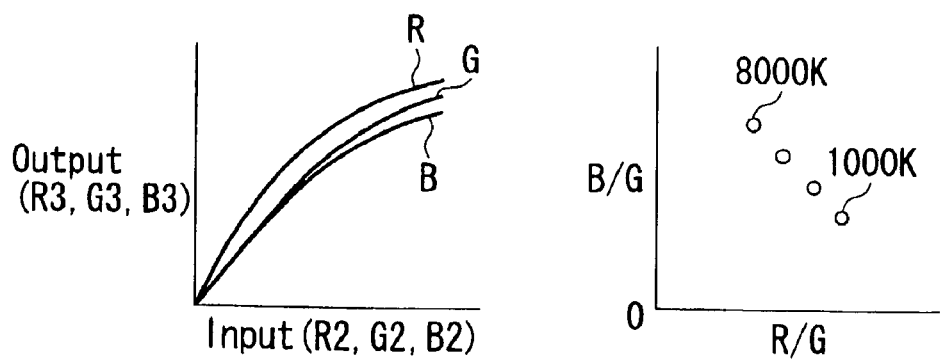
FIG. 10A is a diagram showing input/output characteristics LUT according to the embodiment of the present invention.
FIG. 10B is a diagram showing input/output characteristics according to the embodiment of the present invention.

(2) State of Lighting Conditions (Color Temperature) →Setting of Color Balance Adjustment For the image picked up by the image pickup element 42, when only the lighting image is picked up, color differs with a color temperature of the lighting light. The color temperature of the lighting light of the microscope changes to about 8000 K from 1000 K. In this case, in a graph a ratio R/G of R to G of the RGB data picked up by the image pickup element 42 is plotted as abscissa and a ratio B/G of B to G as ordinate. Then, a distribution is obtained with respect to the color temperature as shown in FIG. 10B. Therefore, inverse ratios G/R and G/B of the ratios R/G and B/G corresponding to each color temperature are coefficients by which R and B signals are multiplied in the color balance corrector 532. The inverse ratios G/R and G/B corresponding to the color temperature are stored as a color balance table by lighting color temperature like the following Table 7 in the memory 48a of the controller 48.

TABLE 7

| | Color balance table by lighting color temperature | | | | | | |
|---|---|---|---|---|---|---|---|
| Color Temperature | 1000 to 2000 | 2000 to 3000 | 3000 to 4000 | 4000 to 5000 | 5000 to 6000 | 6000 to 7000 | 7000 to 8000 |
| Color Balance | G/R, G/B at 1500K | G/R, G/B at 2500K | G/R, G/B at 3500K | G/R, G/B at 4500K | G/R, G/B at 5500K | G/R, G/B at 6500K | G/R, G/B at 7500K |

Figure 13:
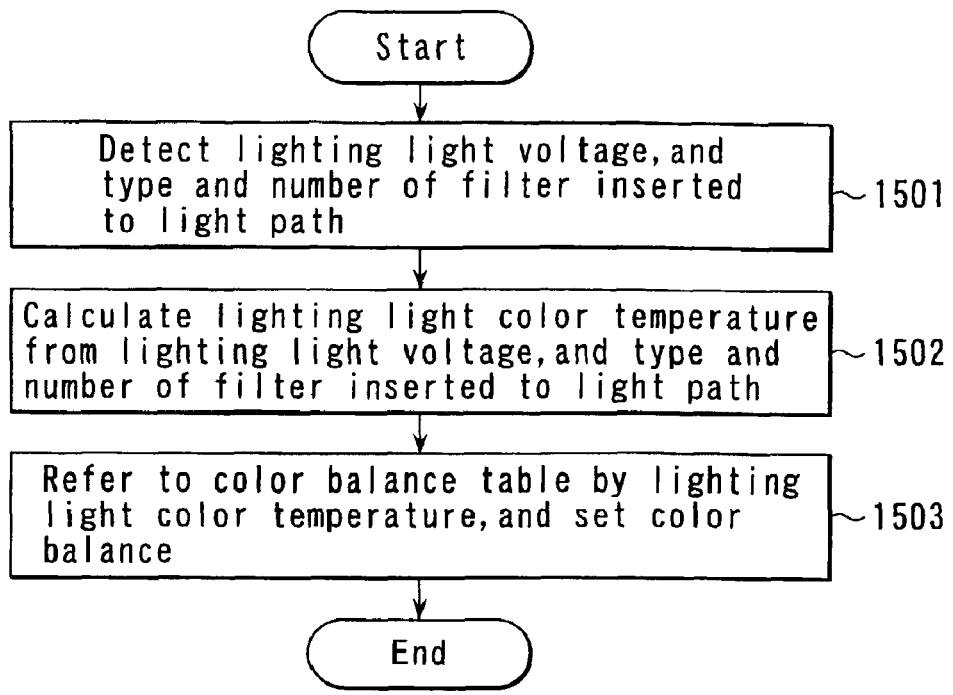
FIG. 13 is a flowchart showing the operation procedure according to the embodiment of the present invention.

FIG. 13 is a flowchart showing the operation procedure according to the second embodiment. First in step 1501, the microscope controller 41 detects the information of type and number of various filters such as ND filter inserted on the light path and color temperature conversion filter from a lighting light voltage for the transmission lighting light source 13 and falling lighting light source 21 and a drive content of the drive circuit section 37. Then, the information is sent to the controller 48 of the electronic camera 36 from the microscope controller 41.

The controller 48 calculates the lighting light color temperature from the inputted information, that is, the lighting light voltage and the type and number of the filter inserted on the light path in step 1502, and subsequently refers to a color balance table by lighting color temperature prepared beforehand as in Table 7, and changes the color balance in step 1503. Additionally, the color balance table by lighting color temperature can be renewed if necessary. Moreover, the table can also be changed as desired by the observer. On changing the table, the color balance is renewed.

The controller 48 outputs the information of the color balance obtained in this manner to the color balance setter 57. Thereby, since the color balance corrector 532 of the image adjuster 53 changes the image color balance to the color balance set by the color balance setter 57, the observation image with a good white balance can be reproduced regardless of the lighting light color temperature.

(3) State of Lighting Conditions (Color Temperature)→Setting of Color Matrix

For the image picked up by the image pickup element 42, the color of the picked-up image differs with the color temperature of the lighting light. The color temperature of the lighting light of the microscope changes to about 8000 K from 1000 K. Color matrix for converting the image picked up at each color temperature to the image data with a visually good reproducibility is stored as a color matrix table by lighting color temperature like the following Table 8 in the memory 48a of the controller 48.

TABLE 8

Color matrix table by lighting color temperature

| Color Temp. | 1000 to 2000 | 2000 to 3000 | 3000 to 4000 | 4000 to 5000 | 5000 to 6000 | 6000 to 7000 | 7000 to 8000 |
|---|---|---|---|---|---|---|---|
| Color Matrix | Color Matrix for 1500K | Color Matrix for 2500K | Color Matrix for 3500K | Color Matrix for 4500K | Color Matrix for 5500K | Color Matrix for 6500K | Color Matrix for 7500K |

Figure 14:
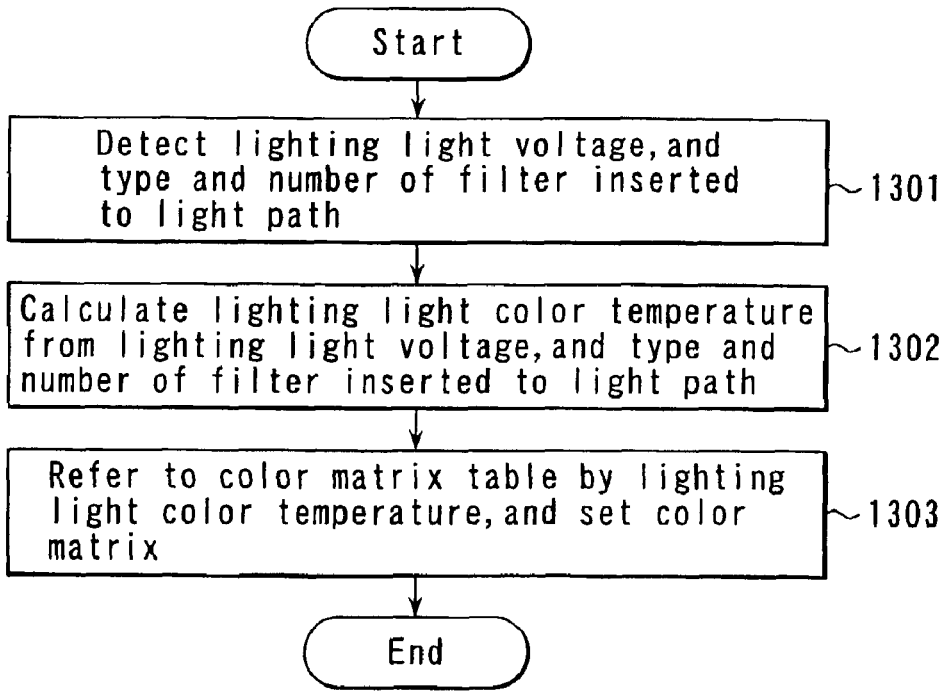
FIG. 14 is a flowchart showing the operation procedure according to the embodiment of the present invention.

FIG. 14 is a flowchart showing the operation procedure according to the second embodiment. First in step 1301, the microscope controller 41 detects the information of the type and number of various filters such as ND filter inserted on the light path and color temperature conversion filter from the lighting light voltage for the transmission lighting light source 13 and falling lighting light source 21 and the drive content of the drive circuit section 37. Then, the information is sent to the controller 48 of the electronic camera 36 from the microscope controller 41.

The controller 48 calculates the lighting light color temperature from the inputted information, that is, the lighting light voltage and the type and number of the filter inserted on the light path in step 1302, and subsequently refers to the color matrix table by lighting color temperature prepared beforehand as in Table 8, and changes the color matrix in step 1303. Additionally, the color matrix table by lighting color temperature can be renewed if necessary. Moreover, the table can also be changed as desired by the observer. On changing the table, the color matrix is renewed.

The controller 48 outputs the information of the color matrix obtained in this manner to the color matrix setter 56. Thereby, since the color matrix corrector 533 of the image adjuster 53 changes the image pattern to the pattern set by the color matrix setter 56, the observation image with a visually good color reproducibility can be reproduced regardless of the lighting light color temperature.

(4) State of Observation Method→Setting of Gradation Characteristics

Gradation characteristics suitable for the observation method are stored as a gradation characteristics table by observation method like the following Table 9 in the memory 48a of the controller 48.

TABLE 9

Gradation characteristics table by observation method

| Observation Method | Transmission Observation Method | | | | Falling Observation Method | | |
|---|---|---|---|---|---|---|---|
| | Bright Field | Dark Field | Diff. Int. | Phase Diff. | Bright Field | Dark Field | Fluo. |
| Gradation Characteristics | A | B | C | C | A | B | D |

Figure 15A:
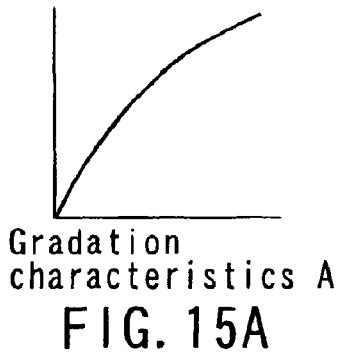
FIGS. 15A to 15D are diagrams showing the input/output characteristics LUT according to the embodiment of the present invention.
Figure 15B:
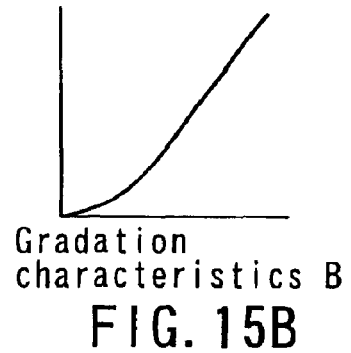
Figure 15C:
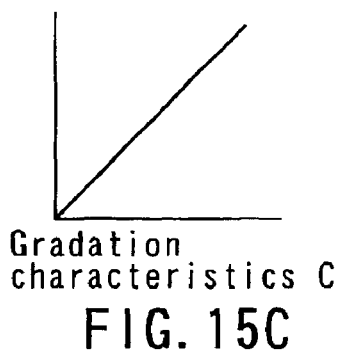
Figure 15D:
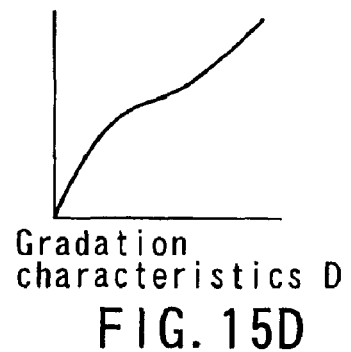

FIGS. 15A to 15D are diagrams showing the input/output characteristics LUT of the gradation characteristics A to D in Table 9, respectively. Here, gradation characteristics A are shown in FIG. 15A, and suitable for the transmission bright field observation and falling (incident) light field observation. Gradation characteristics B are shown in FIG. 15B, and suitable for transmission dark field observation and falling (incident) dark field observation. Gradation characteristics C are shown in FIG. 15C, and suitable for differential interference observation and phase difference observation. Moreover, gradation characteristics D are shown in FIG. 15D, and suitable for falling fluorescent observation. Additionally, the gradation characteristics table by observation method can be renewed if necessary. On changing the table, the gradation characteristics of the observation method can be renewed.

Figure 16:
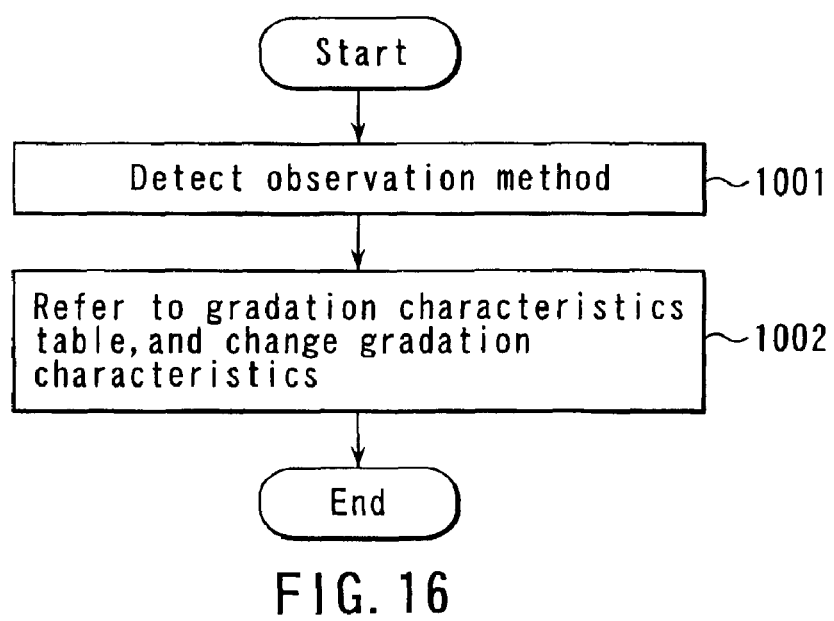
FIG. 16 is a flowchart showing the operation procedure according to the embodiment of the present invention.

FIG. 16 is a flowchart showing the operation procedure according to the second embodiment. First in step 1001, the microscope controller 41 detects the observation method, and the information is sent to the controller 48 of the electronic camera 36. In step 1002, the controller 48 refers to the gradation characteristics table by observation method prepared beforehand as shown in Table 9 from the inputted information, and changes the gradation characteristics.

The controller 48 obtains the gradation characteristics optimum for the observation method in this manner, and outputs the characteristics to the gradation characteristics setter 58. Thereby, since the gradation characteristics corrector 534 of the image adjuster 53 changes the image gradation to the gradation characteristics set by the gradation characteristics setter 58, the gradation suitable for the observation method can be reproduced. Additionally, the gradation characteristics can be disposed for each RGB data.

(5) State of Projection Magnification→Setting of Filter

Figure 17:
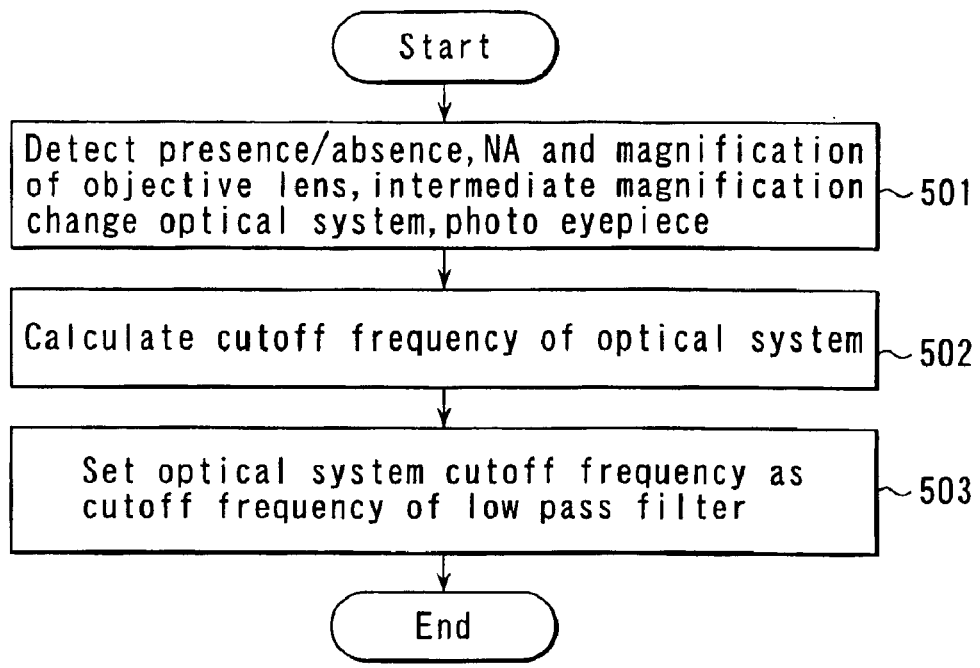
FIG. 17 is a flowchart showing the operation procedure according to the embodiment of the present invention.

FIG. 17 is a flowchart showing the operation procedure of the second embodiment. The microscope controller 41 informs the controller 48 of a change of the projection magnification such as the objective lens magnification. Then, in step 501, the microscope controller 41 detects the presence/absence, NA and magnification of the objective lens 27, intermediate magnification change optical system 33, and photo eyepiece unit 35 from the information of the objective lens 27 by the objective lens detector 38, information of the intermediate magnification change optical system 33 by the drive circuit section 37, and information of the photo eyepiece unit 35 by the photo eyepiece detector 40. The information is sent to the controller 48 of the electronic camera 36.

The controller 48 calculates a cutoff frequency of the optical system in step 502, sets the cutoff frequency of the optical system as the cutoff frequency of a low pass filter in step 503, and outputs the cutoff frequency to the filter setter 54. Thereby, in the filter section 535 of the image adjuster 53, the cutoff frequency of the low pass filter is set in accordance with the cutoff frequency of the optical system. Therefore, information indicating the cutoff frequency of an optical system which cannot be present on the image, or more cutoff frequency can be removed. Additionally, the low pass filter may be constituted by either software or hardware. In the image adjuster 53, the aforementioned settings (1) to (5) are performed, but the following setting (6) may also be performed.

(6) Change of Observation Method→Setting of other Image Adjustment Conditions

When a change of the observation method for use is informed from the microscope controller 41, the controller 48 obtains a filter combination optimum for the observation method from the inputted information, and outputs the combination to the filter setter 54. Thereby, in the filter section 535 of the image adjuster 53, the filter combination is changed to the filter combination set by the filter setter 54.

Moreover, when the information of the observation method in the microscope controller 41 is inputted to the controller 48, the controller 48 obtains the color matrix pattern optimum for the observation method from the inputted information, and outputs the pattern to the color matrix setter 56. Thereby, since the color matrix corrector 533 of the image adjuster 53 is changed to the color matrix pattern set by the color matrix setter 56, color reproduction suitable for the observation method can be performed.

Furthermore, when the observation method of the microscope controller 41 is inputted to the controller 48, the controller 48 obtains the color balance optimum for the observation method from the inputted information based on the prepared table, and outputs the color balance to the color balance setter 57. Thereby, since the color balance corrector 532 of the image adjuster 53 is changed to the color balance set by the color balance setter 57, the color reproduction suitable for the observation method can be performed.

As described above, according to the second embodiment, image quality adjustment conditions of the image data read from the image pickup element can be controlled to be optimum in accordance with any state of the projection magnification, observation method and lighting conditions of the microscope. Therefore, even if the observer is not skilled in handling the electronic camera, the observation image by the microscope can constantly be picked up in the optimum state.

In a third embodiment, image recording conditions are set to be optimum in accordance with the microscope projection magnification or the observation method state.

Figure 18:
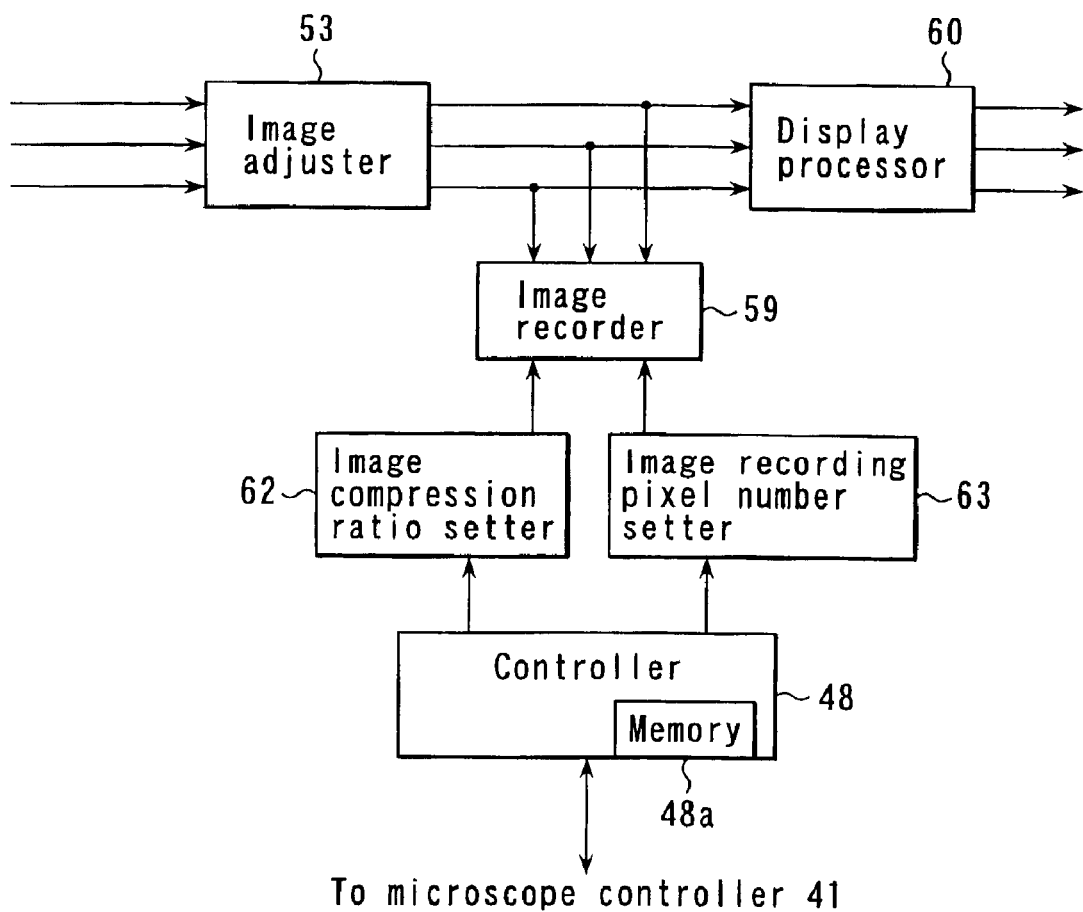
FIG. 18 is a diagram showing a constitution of the microscope and electronic camera according to the embodiment of the present invention.

FIG. 18 is a diagram showing a constitution of the microscope and electronic camera according to the third embodiment. Since FIG. 18 shows a related part extracted from the constitution shown in FIG. 3, the description of the constituting part is omitted.

(1) State of Projection Magnification→Recording Pixel Number

Figure 19:
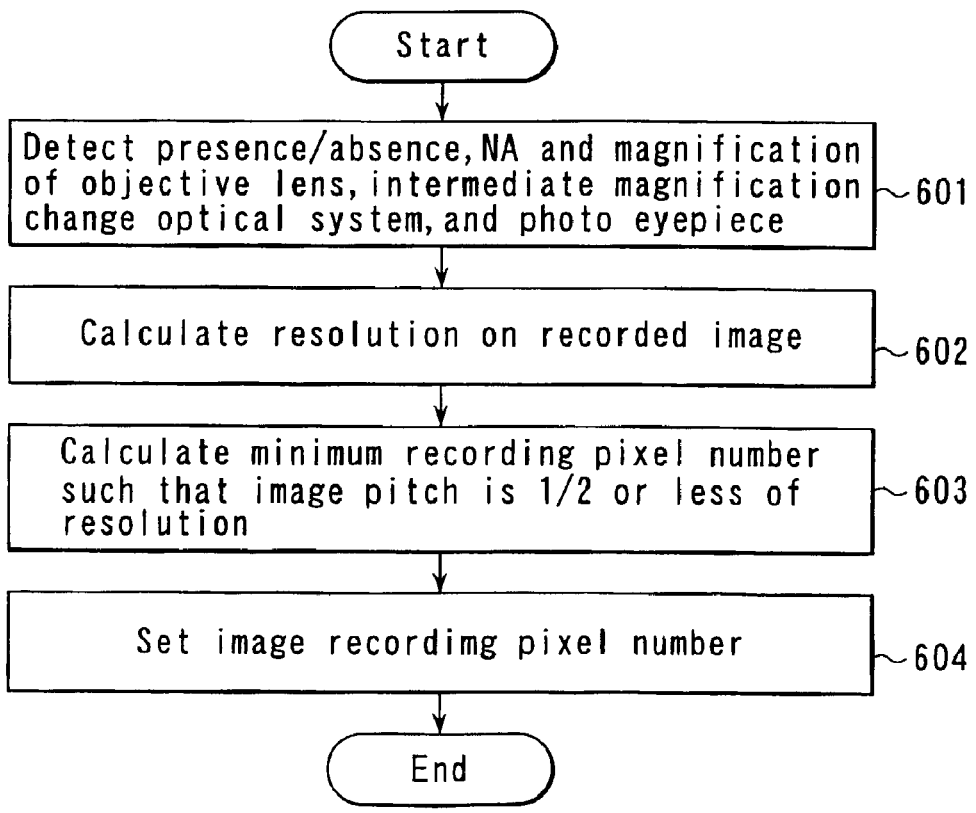
FIG. 19 is a flowchart showing the operation procedure according to the embodiment of the present invention.

FIG. 19 is a flowchart showing the operation procedure according to the third embodiment. First in step 601, the microscope controller 41 detects the presence/absence and magnification of the objective lens 27, intermediate magnification change optical system 33, and photo eyepiece unit 35 from the information of the objective lens 27 by the objective lens detector 38, information of the intermediate magnification change optical system 33 by the drive circuit section 37, and information of the photo eyepiece unit 35 by the photo eyepiece detector 40.

The information detected by the microscope controller 41 is sent to the controller 48 of the electronic camera 36. The controller 48 stores a correspondence table of the objective lens and NA such as Table 10 in the memory 48a, and obtains the NA of the objective lens from the table.

TABLE 10

Correspondence table of objective lens type and NA

| Objective Lens | 4 Times | 10 Times | 20 Times | 40 Times | 60 Times |
|---|---|---|---|---|---|
| NA | 0.16 | 0.4 | 0.7 | 0.8 | 0.9 |

In step 602, the controller 48 calculates the resolution on the image pickup element 42 from the inputted information. That is, the controller 48 obtains the image forming magnification of the entire optical system from the inputted objective lens 27, zoom magnification of the intermediate magnification change optical system 33, and magnification of the photo eyepiece, and obtains NA of the light incident upon the electronic camera 36 from the magnification and the predetermined NA by the following equation.

*NA* of incident light=*NA* of objective lens/image forming magnification of optical system Furthermore, the controller 48 obtains the resolution R on the image pickup element 42 from the NA by the following equation.

$R=0.5\lambda/NA$ of incident light or $0.61\lambda/NA$ of incident light ($\lambda$ denotes one of wavelengths of lights constituting the light image: for example, 0.55 μm)

Next in step 603, the controller obtains a minimum recording pixel number such that a pixel pitch is ½ or less of the resolution. That is, on the assumption that the pixel pitch of the recording pixel is Ip, the controller obtains the recording pixel number which satisfies the following equation and maximizes Ip.

$$Ip<R/2$$

Next in step 604, the controller outputs the recording pixel number to the image recording pixel number setter 63. Thereby, in the image recorder 59, the image can be recorded with data of the minimum image recording pixel number to such an extent that optical information by the microscope is not lacking. Therefore, storage capacity can be saved in the image recorder 59.

As other methods for obtaining the recording pixel number, the following modification examples are considered.

(1—1) Modification Example 1

The NA is obtained from the correspondence table of the optical system combination and NA, the resolution is obtained from the NA, and the recording pixel number is obtained from the relation between the resolution and the recording image pixel pitch.

That is, the following Table 11 is stored beforehand in the memory 48a of the controller 48. The controller 48 identifies the optical system combination by the information from the microscope controller 41 as described above, compares the combination with that in the stored table, and obtains NA of the light incident upon the electronic camera by the corresponding optical system combination.

TABLE 11

Correspondence table of optical system combination and NA

| Objective Lens (times) | 4 | 4 | 4 | 4 | 10 | ... | 40 | 40 | ... |
|---|---|---|---|---|---|---|---|---|---|
| Intermediate Magnification Change (times) | 1 | 1 | 2 | 2 | 1 | ... | 1 | 1 | ... |
| Photo Eyepiece (times) | 1 | 2 | 1 | 2 | 1 | ... | 1 | 2 | ... |
| NA | 0.04 | 0.02 | 0.02 | 0.01 | 0.04 | ... | 0.02 | 0.01 | ... |

Subsequently, the controller obtains the resolution R from the NA of the light by the following equation.

$R=0.5\lambda/NA$ of incident light or $0.61\lambda/NA$ of incident light ($\lambda$ denotes one of wavelengths of lights constituting the light image: for example, 0.55 μm)

Furthermore, the controller obtains the recording pixel number which satisfies the following equation and maximizes Ip.

$$Ip<R/2$$

(1-2) Modification Example 2

When the image forming optical system of the microscope is constituted of the objective lens 27 and one type of image forming lens, the NA is obtained from the correspondence table of the objective lens and NA, the resolution is obtained from NA, and the recording pixel number is obtained from the relation between the resolution and the recording image pixel pitch.

That is, the correspondence table of the objective lens and NA on the image pickup element like the following Table 12 is stored beforehand in the memory 48a of the controller 48. The controller 48 identifies the objective lens for use by the information from the microscope controller 41 as described above, and obtains the NA on the image pickup element for the objective lens.

TABLE 12

Correspondence table of objective lens type and NA

| Objective Lens | 4 Times | 10 Times | 20 Times | 40 Times | 60 Times |
|---|---|---|---|---|---|
| NA | 0.04 | 0.04 | 0.035 | 0.02 | 0.015 |

Furthermore, the controller obtains the resolution from the NA by the following equation.

$R=0.5\lambda/NA$ or $0.61\lambda/NA$ ($\lambda$ denotes one of wavelengths of lights constituting the light image)

Additionally, the controller obtains the recording pixel number which satisfies the following equation and maximizes Ip.

$$Ip<R/2$$

(2) State of Projection Magnification→Setting of Compression Ratio

The information of the projection magnification by the combination of the objective lens 27, intermediate magnification change optical system 33, and photo eyepiece unit 35 is outputted to the controller 48 from the microscope controller 41. Then, the controller 48 obtains a compression ratio optimum for the projection magnification of the optical system, that is, a maximum compression ratio which can reproduce the resolution of the optical system from the inputted information, and outputs the compression ratio to the image compression ratio setter 62. Thereby, the compression ratio of the image recorder 59 is changed to the compression ratio set by the image compression ratio setter 62, and the storage capacity in the image recorder 59 can be saved. The image recording pixel number and image recording compression ratio are set as described in the above (1) and (2), but can also be set as described in the following (3).

(3) State of Observation Method→Setting of Recording Pixel Number and Compression Ratio When the information of the observation method is inputted to the controller 48 from the microscope controller 41, the controller 48 obtains the compression ratio and pixel number optimum for the observation method from the inputted information, and outputs the compression ratio and pixel number to the image compression ratio setter 62 and image recording pixel number setter 63. Thereby, the compression ratio and image recording pixel number in the image recorder 59 are changed to the compression ratio set by the image compression ratio setter 62, and the image recording pixel number set by the image recording pixel number setter 63. Therefore, the image can be recorded with the compression ratio and pixel number suitable for the observation method.

As described above, according to the third embodiment, image recording conditions can be set to be optimum in accordance with the microscope projection magnification or the observation method state. Therefore, even if the observer is not skilled in handling the electronic camera, the observation image by the microscope can constantly be recorded in the optimum state.

In a fourth embodiment, a display state and operation state of the electronic camera are set to be optimum in accordance with the operation state of the microscope.

Figure 20:
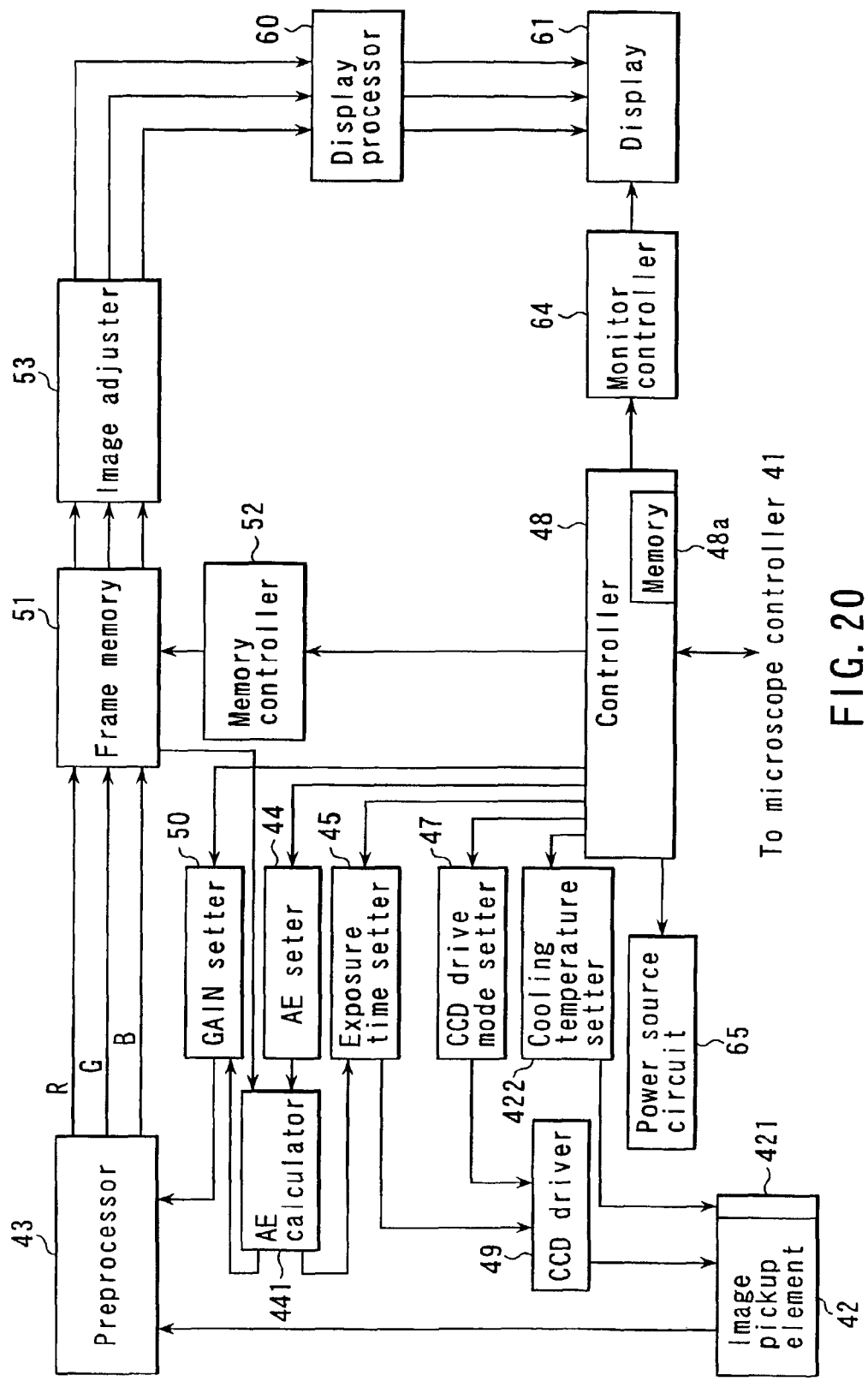
FIG. 20 is a diagram showing a constitution of the microscope and electronic camera according to the embodiment of the present invention.

FIG. 20 is a diagram showing a constitution of the microscope and electronic camera according to the fourth embodiment. Since FIG. 20 shows a related part extracted from the constitution shown in FIG. 3, description of the constituting part is omitted.

(1) Processing during Revolver Rotating Operation

When the microscope controller 41 detects a rotating operation of the revolver 28 by the drive circuit section 37, the information is sent to the controller 48 of the electronic camera 36 from the microscope controller 41.

The controller 48 outputs an instruction indicating that the exposure time and gain immediately before the operation be maintained from the inputted information to the AE setter 44, and stops the operation of the exposure time setter 45 and gain setter 50. This can avoid high luminance emission or darkening of the display screen in the display 61 attributed to a rapid change of the observation image with the rotation of the revolver 28, and can reduce observer's discomfort.

Similarly, when the microscope controller 41 detects the rotating operation of the revolver 28 by the drive circuit section 37, the controller 48 outputs an instruction to the memory controller 52 to stop rewriting of the frame memory 51 based on the information inputted from the microscope controller 41. This can also avoid the high luminance emission or darkening of the display screen in the display 61 attributed to the rapid change of the observation image with the rotation of the revolver 28, and the image before the operation can continuously be displayed in a frozen state.

(2) Processing During Stage Operation

When the microscope controller 41 detects a moving operation of the stage 26 by the drive circuit section 37, the information is sent to the controller 48 of the electronic camera 36 from the microscope controller 41. The controller 48 outputs the instruction to the AE setter 44 to maintain the exposure time and gain immediately before the operation based on the inputted information, and stops the operation of the exposure time setter 45 and gain setter 50. This can eliminate the change of the observation image by AE, only the change of the display screen of the display 61 with moving of the stage 26 is obtained, and a position of the stage 26 can easily be adjusted in this state.

Similarly, when the microscope controller 41 detects the moving operation of the stage 26 by the drive circuit section 37, the controller 48 outputs the instruction to the memory controller 52 based on the inputted information to stop rewriting of the frame memory 51. This can also avoid the high luminance emission or darkening of the display screen in the display 61 attributed to the rapid change of the observation image with the movement of the stage 26, and the image before the operation can continuously be displayed in the frozen state.

Moreover, when the microscope controller 41 detects the moving operation of the stage 26 by the drive circuit section 37, the controller 48 instructs the CCD drive mode setter 47 to set the drive mode of the image pickup element 42 to a high speed reading mode based on the inputted information. Therefore, during the movement of the stage 26, the drive mode of the image pickup element 42 is set to the high speed reading mode, the observation image displayed as the dynamic image with the movement of the stage 26 is easily seen on the display screen of the display 61, and the position of the stage 26 can easily be adjusted from this state.

(3) Processing with ON/OFF of Lighting Light Source

When the microscope controller 41 detects ON/OFF of lamps of the transmission lighting light source 13 and falling lighting light source 21, the information is sent to the controller 48 of the electronic camera 36 from the microscope controller 41. The controller 48 instruct the AE setter 44 to operate or stop operating in accordance with the inputted information, that is, ON/OFF of the lamp. Thereby, when the lamp is OFF (the display 61 is in a state of black image), the AE setter 44 can be stopped, and this eliminates an unnecessary operation of forcibly extending the exposure time and applying AE.

Similarly, when the microscope controller 41 detects ON/OFF of the lamps of the transmission lighting light source 13 and falling lighting light source 21, the controller 48 instructs the monitor controller 64 to turn ON/OFF the display 61 in accordance with ON/OFF of the lamp. When the lamp is OFF (the display 61 is in the state of black image), the monitor controller 64 can forcibly turn OFF the display 61, and power saving can therefore be realized.

Moreover, when the microscope controller 41 detects ON/OFF of the lamps of the transmission lighting light source 13 and falling lighting light source 21, the controller 48 instructs the memory controller 52 to enable/disable the rewriting of the frame memory 51 in accordance with the inputted information, that is, ON/OFF of the lamp. When the lamp is OFF, the rewriting of the frame memory 51 can be stopped, and this can prevent the display 61 from being brought to the state of black image.

Furthermore, when the microscope controller 41 detects ON/OFF of the lamps of the transmission lighting light source 13 and falling lighting light source 21, the controller 48 indicates a usual operation mode or a standby current mode to the power source circuit 65 in accordance with the inputted information, that is, ON/OFF of the lamp. Thereby, when the lamp is OFF, the power source circuit 65 can be set to the standby current mode, and power saving can be realized.

(4) Processing with Lighting Shutter Operation

When the microscope controller 41 detects ON/OFF of the shutters 23, 161 by the drive circuit section 37, the information is sent to the controller 48 of the electronic camera 36 from the microscope controller 41. In this case, for the detection of shutter ON/OFF, when either one of the shutters 23, 161 of the transmission lighting optical system 11 and falling lighting optical system 12 is open, ON is detected. When both shutters are closed, OFF is detected.

The controller 48 instructs the AE setter 44 to operate or stop operating in accordance with the inputted information, that is, ON/OFF of the shutters 23, 161. Therefore, when the shutters 23, 161 are OFF, the AE operation can be stopped, and this can eliminate the unnecessary operation of forcibly extending the exposure time and operating AE.

Similarly, when the microscope controller 41 detects ON/OFF of the shutters 23, 161 by the drive circuit section 37, the controller 48 instructs the monitor controller 64 to turn ON/OFF the displaying of the display 61 in accordance with the inputted information, that is, ON/OFF of the shutters 23, 161. Thereby, when the shutters 23, 161 are OFF (the display 61 is in the state of black image), the monitor controller 64 can forcibly turn OFF the displaying of the display 61, and power saving can therefore be realized.

Moreover, when the microscope controller 41 detects ON/OFF of the shutters 23, 161 by the drive circuit section 37, the controller 48 instructs the memory controller 52 to enable/disable the rewriting of the frame memory 51 in accordance with the inputted information, that is, ON/OFF of the shutters 23, 161. Thereby, when the shutters 23, 161 are OFF, the rewriting of the frame memory 51 can be stopped, and this can prevent the display 61 from being brought to the black image state.

Furthermore, when the microscope controller 41 detects ON/OFF of the shutters 23, 161 by the drive circuit section 37, the controller 48 indicates the usual operation mode or the standby current mode to the power source circuit 65 in accordance with the inputted information, that is, ON/OFF of the shutters 23, 161. Therefore, when the shutters 23, 161 are OFF, the power source circuit 65 can be set to the standby current mode, and power saving can be realized.

(5) Processing with Light Path Changing Operation

When the microscope controller 41 detects the changing of the light path from the information of the photo eyepiece unit 35 by the photo eyepiece detector 40, and the operation states of the cube unit 30, revolver 28, condenser optical element unit 19, transmitting filter unit 15 and falling filter unit 22 by the drive circuit section 37, the information is sent to the controller 48 of the electronic camera 36 from the microscope controller 41.

The controller 48 outputs the instruction for maintaining the exposure time and gain immediately before the operation to the AE setter 44 based on the inputted information, and stops the operation of the exposure time setter 45 and gain setter 50. This can avoid the high luminance emission or darkening of the display screen in the display 61 attributed to the rapid change of the observation image with the changing of the optical path, and can reduce observer's discomfort.

Similarly, when the microscope controller 41 detects the changing of the light path, the controller 48 outputs the instruction for stopping the rewriting of the frame memory 51 to the memory controller 52 based on the inputted information. This can also avoid the high luminance emission or darkening of the display screen in the display 61 attributed to the rapid change of the observation image with the changing of the light path, and the image before the operation can continuously be displayed in the frozen state.

(6) Processing with Retardation Adjusting Operation

When the microscope controller 41 detects a retardation adjusting operation from the retardation adjusting operation detector 39, the information is sent to the controller 48 of the electronic camera 36 from the microscope controller 41. The controller 48 outputs the instruction for maintaining the exposure time and gain immediately before the operation to the AE setter 44 based on the inputted information, and stops the operation of the exposure time setter 45 and gain setter 50. This can eliminate the change of the image by AE adjustment during retardation adjustment, the image change by only the retardation adjustment can be displayed, and the retardation adjustment can easily be performed.

Similarly, when the microscope controller 41 detects the retardation adjusting operation, the controller 48 instructs the CCD drive mode setter 47 to set the drive mode of the image pickup element 42 to the high speed reading mode based on the inputted information. Since the drive mode of the image pickup element 42 is set to the high speed reading mode during the retardation adjustment, the observation image displayed as the dynamic image by the retardation adjustment is easily seen on the display screen of the display 61, and the retardation adjustment is easily performed from this state.

(7) Processing with Zoom Operation

When the microscope controller 41 detects a zoom operation of the intermediate magnification change optical system (zoom lens tube) 33 by the drive circuit section 37, the information is sent to the controller 48 of the electronic camera 36 from the microscope controller 41. The controller 48 outputs the instruction for maintaining the exposure time and gain immediately before the operation to the AE setter 44 based on the inputted information, and stops the operation of the exposure time setter 45 and gain setter 50. This can eliminate the image change attributed to the AE adjustment during the zoom operation, the image change by only the zoom operation can be displayed, and zoom adjustment can easily be performed.

Similarly, when the microscope controller 41 detects the zoom operation, the controller 48 instructs the CCD drive mode setter 47 to set the drive mode of the image pickup element 42 to the high speed reading mode based on the inputted information. Since the drive mode of the image pickup element 42 is set to the high speed reading mode during the zoom adjustment, the observation image displayed as the dynamic image by the zoom adjustment is easily seen on the display screen of the display 61, and the zoom adjustment is easily performed from this state.

(8) Processing with AE Operation

When the microscope controller 41 detects an AF operation of the AF unit 371 by the drive circuit section 37, the information is sent to the controller 48 of the electronic camera 36 from the microscope controller 41. The controller 48 outputs the instruction for maintaining the exposure time and gain immediately before the operation to the AE setter 44 from the inputted information, and stops the operation of the exposure time setter 45 and gain setter 50. This can eliminate the image change by the AE adjustment during the AF operation, and the change of the observation image can easily be observed on the display 61 during the AF operation.

Similarly, when the microscope controller 41 detects the AF operation, the controller 48 instructs the CCD drive mode setter 47 to set the drive mode of the image pickup element 42 to the high speed reading mode based on the inputted information. Since the drive mode of the image pickup element 42 is set to the high speed reading mode during the AF operation, the observation image displayed as the dynamic image by the AF operation is easily seen on the display screen of the display 61.

(9) Detection of Operation Halt State

When the microscope controller 41 exchanges no information with the respective components of the microscope for a given time, the information indicating this state is sent to the controller 48 of the electronic camera 36 from the microscope controller 41. The controller 48 instructs the monitor controller 64 to forcibly turn OFF the displaying of the display 61 based on the inputted information. Thereby, when no information is exchanged with the microscope controller 41 for the given time, the monitor controller 64 can forcibly turn OFF the displaying of the display 61, and power saving can therefore be realized.

Similarly, when no information is exchanged between the microscope controller 41 and the respective components of the microscope for the given time, the controller 48 indicates the standby current mode to the power source circuit 65 in accordance with the inputted information. When no information is exchanged with the microscope controller 41 for the given time, the power source circuit 65 can be set to the standby current mode, and power saving can be realized. Of course, when the information is sent to the microscope controller 41, the power source circuit 65 is returned to the usual mode.

(10) Processing with Light Path Change of Triple Lens Tube Unit

The microscope controller 41 detects that observation is performed only with the eyepiece 6a using the observation light path S' in the triple lens tube unit 5 as the information of the drive circuit section 37, and the information is then sent to the controller 48 of the electronic camera 36 from the microscope controller 41. The controller 48 instructs the monitor controller 64 to forcibly turn OFF the displaying of the display 61 based on the inputted information. Since the monitor controller 64 can forcibly turn OFF the displaying of the display 61 during the observation only with the eyepiece 6a, power saving can be realized.

Similarly, when the microscope controller 41 detects the observation only with the eyepiece 6a, the controller 48 indicates the standby current mode to the power source circuit 65 in accordance with the inputted information. Since the power source circuit 65 can be set to the standby current mode during the observation only with the eyepiece 6a, power saving can be realized. Of course, when the observation only with the eyepiece 6a ends, and the observation light path S" to the electronic camera 36 is used, the power source circuit 65 is returned to the usual mode.

(11) Processing During Fluorescent Observation

When the information of the observation method is inputted to the controller 48 from the microscope controller 41, the controller 48 obtains a cooling temperature optimum for the observation method based on the inputted information, and allows the cooling temperature setter 422 to set the temperature. For example, in fluorescent observation in which the exposure time is lengthened, the cooling temperature is set to be low. Light field observation with a short exposure time is set in such a manner that cooling is not performed. This can save power consumption without performing unnecessary cooling.

Furthermore, the information of the observation method is inputted to the controller 48, and it is detected that the fluorescent observation is being performed. Then, the controller 48 turns OFF the display 61 during image pickup, or displays a residual exposure time in a part of the display 61 while bringing other parts to a low luminance or non-emission state. In the fluorescent observation, indoor lighting is turned off to avoid stray light in some cases. Furthermore, the stray light from the monitor display 61 can be eliminated, and higher-precision observation can be realized.

As described above, according to the fourth embodiment, the display and operation states of the electronic camera can be set to be optimum in accordance with the operation state of the microscope. Therefore, even if the observer is not skilled in handling the electronic camera, the observation image by the microscope can constantly be picked up in the optimum state.

In a fifth embodiment, detection outputs supplied from various detectors for detecting various situations around the microscope system will be described.

First, when the temperature detector 68 detects the ambient temperature of the microscope system as an installation environment temperature, the environment temperature is sent to the controller 48. The controller 48 judges whether or not the environment temperature detected by the temperature detector 68 is in a preset operation guaranteed range. When the temperature deviates from this range, this is displayed in the warning display 77. Therefore, a warning can be issued against the use of the microscope system in the environment having inappropriate use conditions.

Similarly, when the temperature detector 68 detects the environment temperature, and the controller 48 judges that the environment temperature detected by the temperature detector 68 exceeds the preset operation guaranteed range, the controller 48 gives an operation instruction to the cooler 73, so that ambient of the microscope is forcibly cooled. Therefore, the microscope system can be used in the environment suitable for the use conditions.

Moreover, when the temperature detector 68 detects the environment temperature, and the controller 48 judges that the environment temperature detected by the temperature detector 68 is lower than the preset operation guaranteed range, the controller 48 gives the operation instruction to the warmer 74, so that the ambient of the microscope is forcibly warmed. Therefore, the microscope system can be used in the environment suitable for the use conditions.

Additionally, when it is judged that the environment temperature detected by the temperature detector 68 deviates from the preset operation guaranteed range, the controller 48 can give OFF instruction to the power source circuit 65 to forcibly stop power supply. This can prevent the microscope system from being used in the environment inappropriate for the use conditions.

Next, when the humidity detector 69 detects the ambient humidity of the microscope system as an installation environment humidity, environment humidity information is sent to the controller 48. The controller 48 judges whether or not the environment humidity detected by the humidity detector 69 is in the preset operation guaranteed range. When the humidity deviates from this range, this is displayed in the warning display 77. Therefore, the warning can be issued against the use of the microscope system in the environment inappropriate for the use conditions.

Similarly, when the humidity detector 69 detects the environment humidity, and the controller 48 judges that the environment humidity detected by the humidity detector 69 exceeds the preset operation guaranteed range, the controller 48 gives the operation instruction to the dryer 75, so that the ambient of the microscope is forcibly dried. Therefore, the microscope system can be used in the environment suitable for the use conditions.

Moreover, when the controller 48 judges that the environment humidity detected by the humidity detector 69 deviates from the preset operation guaranteed range, the controller 48 can give the OFF instruction to the power source circuit 65 to forcibly stop the power supply. This can prevent the microscope system from being used in the environment inappropriate for the use conditions.

Moreover, when the atmospheric pressure detector 66 detects an ambient atmospheric pressure of the microscope system as an installation environment atmospheric pressure, information of the environment atmospheric pressure is sent to the controller 48. The controller 48 judges whether or not the environment atmospheric pressure detected by the atmospheric pressure detector 66 is in the preset operation guaranteed range. When the atmospheric pressure deviates from this range, this is displayed in the warning display 77. This can issue the warning against the use of the microscope system in the environment inappropriate for the use conditions.

Furthermore, when the environment illuminance detector 70 detects an ambient brightness of the microscope system as an installation environment brightness, information of the environment illuminance is sent to the controller 48. The controller 48 instructs the monitor controller 64 to adjust display brightness in the display 61 to be optimum for the environment illuminance. Therefore, the brightness can be set in such a manner that the display 61 is most easily seen regardless of the brightness of the installation environment of the microscope system, and an observing operation can be performed under an optimum environment.

Additionally, when the environment lighting spectral characteristics (or color temperature) detector 71 detects spectral characteristics of an environment lighting light around the microscope system, information of the spectral characteristics (or color temperature) is sent to the controller 48. The controller 48 obtains the color matrix such that the display image of the display 61 under the environment lighting with the microscope system installed thereunder can be reproduced in a color close to that of a visible observation image, and outputs the color matrix to the color matrix setter 56. Thereby, the color matrix of the image adjuster 53 is changed to the color matrix pattern set by the color matrix setter 56, and the same observation image as the visible image can be reproduced on the display 61 regardless of the lighting light spectral characteristics (or color temperature) in the installation environment of the microscope system.

Moreover, when the vibration detector 72 detects vibration transmitted to the microscope system, vibration amplitude information is sent to the controller 48. The controller 48 judges whether or not the amplitude of the vibration detected by the vibration detector 72 is in the preset operation guaranteed range. When the amplitude deviates from this range, this is warned/displayed in the warning display 77. This can issue the warning against the use of the microscope system in a situation in which the vibration inappropriate for the use conditions is applied.

Similarly, when the vibration detector 72 detect the vibration transmitted to the microscope system, the controller 48 judges whether or not the amplitude of the vibration detected by the vibration detector 72 is in the preset operation guaranteed range. When the amplitude deviates from this range, this is warned/displayed in the image blur warning display 76. This can issue the warning against the use of the microscope system inappropriate for the use conditions.

Moreover, when the vibration detector 72 detects the vibration transmitted to the microscope system, the controller 48 obtains a longest exposure time in accordance with the amplitude of the vibration detected by the vibration detector 72, and outputs the exposure time to the exposure time setter 45. The longest exposure time can be set as the observation image pickup conditions in this manner. Therefore, if a certain degree of vibration is applied to the microscope system, the image pickup can be continued without being conscious of the adverse conditions.

Furthermore, the vibration detector 72 detects the vibration transmitted to the microscope system, and the controller 48 judges that the amplitude of the vibration detected by the vibration detector 72 is in a preset vibration removing start range. Then, the controller 48 instructs the active vibration removing controller 78 to start removing the vibration. Therefore, the vibration of the microscope system itself can be removed, and the microscope system can be used even under the environment inappropriate for the use conditions.

Additionally, when the controller 48 judges that the amplitude of the detected vibration deviates from the preset operation guaranteed range, the controller 48 can give the OFF instruction to the power source circuit 65 to forcibly stop the power supply. This can prevent the microscope system from being used in the environment inappropriate for the use conditions.

Moreover, when the magnetic field detector 67 detects a magnetic field of the installation environment of the microscope system, information indicating a magnetic field intensity is sent to the controller 48. The controller 48 instructs the monitor controller 64 to degauss the display 61 based on the information detected by the magnetic field detector 67. Therefore, the observer does not have to consciously degauss the display, and the degaussing can automatically be performed in accordance with a change of the magnetic field of the microscope system installation environment.

Furthermore, when GPS or another position detector 651 detects an installation area of the microscope system, area information is sent to the controller 48. The controller 48 obtains an official language in a microscope system installation place based on the area information detected by the position detector 651, and all languages for use are changed in the system. Therefore, even when the microscope system is installed in any area on the earth, the observer can operate the system by a display using the language of the installation area without caring about the installation area.

Additionally, the respective operations described in the aforementioned embodiments can simultaneously be performed in a non-competitive range, and the observer can appropriately select the desired operation by sending the instruction to the controller 48 via a setting section (not shown).

As described above, according to the present invention, the electronic camera can automatically be set in the optimum conditions based on microscope-side setting and operating states. Therefore, even if the observer is not skilled in handling the electronic camera, the observation image by the microscope can constantly be picked up in the optimum state.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A microscope system in which an electronic camera is used to pick up an observation image by a microscope, comprising:

a controlling section for setting an image pickup operation of an image pickup element in said electronic camera to an optimum state in accordance with a state of at least one of an optical system combination for a projection magnification of at least an objective lens and a photo eyepiece on a microscope side, an observation method, and lighting conditions;

a microscope controlling section for controlling an operation of said microscope; and an image pickup element driving section for driving said image pickup element, wherein said image pickup element driving section has a high speed reading mode for driving the image pickup element to produce an image signal by binning or thinning reading, and a low speed reading mode for driving the image pickup element to produce an image signal with a greater number of pixels than the image signal produced in the high speed reading mode;

wherein said controlling section sets an image pickup element drive mode of said image pickup element driving section to the high speed reading mode, while the controlling section detects operation information outputted from said microscope controlling section.

2. The microscope system according to claim 1, further comprising:

an image forming lens and an intermediate magnification change optical system, wherein said controlling section sets a binning number of said image pickup element driving section based on an objective lens type, an image forming lens type and a zoom magnification of the intermediate magnification change optical system outputted from said microscope controlling section.

3. The microscope system according to claim 2, wherein said controlling section comprises a memory in which a table of the binning number corresponding to a combination of the objective lens type, the image forming lens type and the zoom magnification of the intermediate magnification change optical system is stored, compares the combination of the objective lens type, the image forming lens type and the zoom magnification of the intermediate magnification change optical system outputted from said microscope controlling section with said table to determine the binning number, and sets the binning number as the binning number of said image pickup element driving section.

4. The microscope system according to claim 1, further comprising:

an AE calculating section for performing an automatic exposure control, wherein said controlling section stops an exposure time control in said AE calculating section, while the controlling section detects information of light path change of said microscope outputted from said microscope controlling section.

5. The microscope system according to claim 1, further comprising:

a frame memory for storing image data picked up by said image pickup element, wherein said controlling section stops rewriting of the image data to said frame memory, while the controlling section detects information of light path change of said microscope outputted from said microscope controlling section.

6. The microscope system according to claim 1, further comprising:

a cooling section for cooling said image pickup element, wherein said controlling section changes a set temperature set to said cooling section in accordance with an observation method outputted from said microscope controlling section.

7. The microscope system according to claim 1, further comprising:

a preprocessor for converting the image signal from the image pickup element into digital image data;

a frame memory for storing the digital image data which has been converted in the preprocessor; and an AE calculator for carrying out automatic exposure control based on the image data stored in the frame memory;

wherein the AE calculator stops exposure time control while conversion information of a light path of the microscope outputted from the microscope controlling section is detected.

8. A microscope system in which an electronic camera is used to pick up an observation image by a microscope, comprising:

a controlling section for setting an image pickup operation of an image pickup element in said electronic camera to an optimum state in accordance with a state of at least one of an optical system combination for a projection magnification of at least an objective lens and a photo eyepiece on a microscope side, an observation method, and lighting conditions;

a microscope controlling section for controlling an operation of said microscope; and an image pickup element driving section for driving said image pickup element, wherein said image pickup element driving section has a binning function for driving the image pickup element to pick up the observation image in units of an image pickup unit comprising a plurality of adjacent pixels;

wherein said controlling section sets a binning number, which indicates a size of the image pickup unit, of said image pickup element driving section based on an objective lens type outputted from said microscope controlling section.

9. The microscope system according to claim 8, wherein said controlling section comprises a memory in which a table of the objective lens type and the corresponding binning number is stored, compares the objective lens type outputted from said microscope controlling section with said table to determine the binning number, and sets the binning number as the binning number of said image pickup element driving section.

10. The microscope system according to claim 8, further comprising:
   an image forming lens and an intermediate magnification change optical system,
   wherein said controlling section sets a binning number of said image pickup element driving section based on an objective lens type, an image forming lens type and a zoom magnification of the intermediate magnification change optical system outputted from said microscope controlling section.

11. The microscope system according to claim 10, wherein said controlling section comprises a memory in which a table of the binning number corresponding to a combination of the objective lens type, the image forming lens type and the zoom magnification of the intermediate magnification change optical system is stored, compares the combination of the objective lens type, the image forming lens type and the zoom magnification of the intermediate magnification change optical system outputted from said microscope controlling section with said table to determine the binning number, and sets the binning number as the binning number of said image pickup element driving section.

12. The microscope system according to claim 8, further comprising:
   an AE calculating section for performing an automatic exposure control,
   wherein said controlling section stops an exposure time control in said AE calculating section, while the controlling section detects information of light path change of said microscope outputted from said microscope controlling section.

13. The microscope system according to claim 8, further comprising:
   a frame memory for storing image data picked up by said image pickup element,
   wherein said controlling section stops rewriting of the image data to said frame memory, while the controlling section detects information of light path change of said microscope outputted from said microscope controlling section.

14. The microscope system according to claim 8, further comprising:
   a cooling section for cooling said image pickup element,
   wherein said controlling section changes a set temperature set to said cooling section in accordance with an observation method outputted from said microscope controlling section.

15. The microscope system according to claim 8, further comprising:
   a preprocessor for converting the image signal from the image pickup element into digital image data;
   a frame memory for storing the digital image data which has been converted in the preprocessor; and
   an AE calculator for carrying out automatic exposure control based on the image data stored in the frame memory;
   wherein the AE calculator stops exposure time control while conversion information of a light path of the microscope outputted from the microscope controlling section is detected.

16. A microscope system in which an electronic camera is used to pick up an observation image by a microscope, comprising:
   a controlling section for setting an image pickup operation of an image pickup element in said electronic camera to an optimum state in accordance with state of at least one of an optical system combination for a projection magnification of at least an objective lens and a photo eyepiece on a microscope side, an observation method, and lighting conditions;
   a microscope controlling section for controlling an operation of said microscope; and
   an image pickup element driving section for driving said image pickup element;
   wherein said controlling section sets a binning number of said image pickup element driving section based on an objective lens type outputted from said microscope controlling section; and
   wherein said controlling section comprises a memory in which a table of the objective lens type and a corresponding NA of a light image incident upon said electronic camera is stored, compare the objective lens type outputted from said microscope controlling section with said table to obtain the NA of the light image incident upon said electronic camera, obtains a resolution R of said light image from the NA, obtains the binning number as a maximum integer of 1 or more satisfying:

$$B < R/2p$$

when the binning number is B and an element pitch of said image pickup element is p, and sets the binning number as the binning number of said image pickup element driving section.

17. A microscope system in which an electronic camera is used to pick up an observation image by a microscope, comprising:
   a controlling section for setting an image pickup operation of an image pickup element in said electronic camera to an optimum state in accordance with a state of at least one of an optical system combination for a projection magnification of at least an objective lens and a photo eyepiece on a microscope side, an observation method, and lighting conditions;
   a microscope controlling section for controlling an operation of said microscope;
   an image pickup element driving section for driving said image pickup element; and
   an image forming lens and an intermediate magnification change optical system;
   wherein said controlling section sets an image pickup element drive mode of said image pickup element driving section to a high speed drive mode, while the controlling section detects operation information outputted from said microscope controlling section;

wherein said controlling section sets a binning number of said image pickup element driving section based on an objective lens type, an image forming lens type and a zoo magnification of the intermediate magnification change optical system outputted from said microscope controlling section; and wherein said controlling section comprises a memory in which a table of a combination of the objective lens type, the image forming lens type and the zoom magnification of the intermediate magnification change optical system and a corresponding NA of a light image incident upon said electronic camera is stored, compares the objective lens type, the image forming lens type and the zoom magnification of the intermediate magnification change optical system outputted from said microscope controlling section with said table to obtain the NA of the light image incident upon said electronic camera, obtains a resolution R (=0.5λ/NA or 0.61λ/NA: λ denoting one of wavelengths of lights constituting the light image) of said light image from the NA, obtains the binning number as a maximum integer of 1 or more satisfying:

$B < R/2p$ when the binning number is B and an element pitch of said image pickup element is p, and sets the binning number as the binning number of said image pickup element driving section.

18. A microscope system in which an electronic camera is used to pick up an observation image by a microscope, comprising:

a controlling section for setting an image pickup operation of an image pickup element in said electronic camera to an optimum state in accordance with a state of at least one of an optical system combination for a projection magnification of at least an objective lens and a photo eyepiece on a microscope side, an observation method, and lighting conditions;

a microscope controlling section for controlling an operation of said microscope;

an image pickup element driving section for driving said image pickup element; and an image forming lens and an intermediate magnification change optical system;

wherein said controlling section sets an image pickup element drive mode of said image pickup element driving section to a high speed drive mode, while the controlling section detects operation information outputted from said microscope controlling section;

wherein said controlling section sets a binning number of said image pickup element driving section based on an objective lens type, an image informing lens type and a zoom magnification of the intermediate magnification change optical system outputted from said microscope controlling section; and wherein said controlling section:

comprises a memory in which a table of an NA and a magnification corresponding to the objective lens type is stored, compares the objective lens type outputted from said microscope controlling section with said table to obtain the NA of the objective lens, obtains an image forming magnification of an optical system of said microscope from the objective lens type, the image forming lens type and the zoom magnification of the intermediate magnification change optical system outputted from said microscope controlling section, obtains the NA of a light image incident upon said electronic camera from the NA of said objective lens and the image forming magnification of said optical system by the following equation:

$NA = NA$ of the objective lens/the image forming magnification of the optical system, obtains a resolution R (=0.5λ/NA or 0.61λ/NA: λ denoting one of wavelengths of lights constituting the light image) of the light image from the NA, obtains the binning number as a maximum integer of 1 or more satisfying:

$B < R/2p$ when the binning number is B and an element pitch of the image pickup element is p, and sets the binning number as the binning number of said image pickup element driving section.

19. A microscope system in which an electronic camera is used to pick up an observation image by a microscope, comprising:

a controlling section for setting an image pickup element in said electronic camera to an optimum state in accordance with a state of at least one of an optical system combination for a projection magnification of at least an objective lens and a photo eye piece on a microscope side, an observation method, and lighting conditions;

a microscope controlling section for controlling an operating of said microscope; and an image adjusting section for adjusting image data picked up by said image pickup element;

wherein said controlling section comprises a memory in which at least one color matrix corresponding to a lighting light color temperature is stored, calculates the lighting light color temperature from types and a number of filters inserted in a light path and a lighting light voltage which are output from said microscope controlling section, compares the calculated lighting light color temperature with a content of said memory, and sets the color matrix in accordance with the lighting light color temperature to said image adjusting section, and wherein said image adjusting section performs a color conversion of the image data in accordance with the set color matrix.

20. A microscope system in which an electronic camera is used to pick up an observation image by a microscope, comprising:

a controlling section for setting recording of an image picked up by said electronic camera to an optimum state in accordance with a state of at least one of an optical system combination for a projection magnification of at least an objective lens and a photo eyepiece on a microscope side, and an observation method;

a microscope controlling section for controlling an operation of said microscope; and an image recording section for recording image data picked up by said image pickup element;

wherein said controlling section sets a recording pixel number of an image recording section based on an objective lens type output by said microscope controlling section; and wherein said controlling section comprises a memory in which a table of the objective lens type and a corresponding NA of a light image incident upon said electronic camera, obtains a resolution R (=0.5λ/NA or 0.61λ/NA: λ denoting one of the wavelengths of lights constituting the light image) of the light image from the NA, obtains the recording pixel number as a maximum pixel pitch satisfying:

$$Ip<R/2$$

when a pixel pitch of a recorded image is Ip, and sets the recording pixel number as the recording pixel number of said image recording section.

21. A microscope system in which an electronic camera is used to pick up an observation image by a microscope, comprising:

a controlling section for setting recording of an image picked up by said electronic camera to an optimum state in accordance with a state of at least one of an optical, system combination for a projection magnification of at least an objective lens and a photo eyepiece on a microscope side, and an observation method;

a microscope controlling section for controlling an operation of said microscope;

an image recording section for recording image data picked up by said image pickup element; and an image forming lens and an intermediate magnification change optical system;

wherein said controlling section sets a recording pixel number of an image recording section based on an objective lens type output by said microscope controlling section;

wherein said controlling section sets a recording pixel number of an image recording section based on an objective lens type, an image forming lens type and a zoom magnification of an intermediate magnification change optical system output by said microscope controlling section; and wherein said controlling section comprises a memory in which a table of a combination of the objective lens type, the image forming lens type and the zoom magnification of the intermediate magnification change optical system and a corresponding NA of a light image incident upon said electronic camera is stored, compares the objective lens type, the image forming lens type and the zoom magnification of the intermediate magnification change optical system outputted from said microscope controlling section with said table to determine the NA of the light image incident upon said electronic camera, obtains a resolution R (=0.5λ/NA or 0.61λ/NA: λ denoting one of the wavelengths of lights constituting the light image) of the light image from the NA, obtains the recording pixel number as a maximum pixel pitch satisfying:

$$Ip<R/2$$

when a pixel pitch of a recorded image is Ip, and sets the recording pixel number as the recording pixel number of said image recording section.

22. A microscope system in which an electronic camera is used to pick up an observation image by a microscope, comprising:

a controlling section for setting recording of an image picked up by said electronic camera to an optimum state in accordance with a state of at least one of an optical system combination for a projection magnification of at least an objection lens and a photo eyepiece on a microscope side, and an observation method;

a microscope controlling section for controlling an operation of said microscope;

an image recording section for recording image data picked up said image pickup element; and an image forming lens and an intermediate magnification chance optical system;

wherein said controlling section sets recording pixel number of an image recording section based on an objection lens type output by said microscope controlling section;

wherein said controlling section sets a recording pixel number of an image recording section based on an objective lens type, an image forming lens type and a zoo magnification of an intermediate magnification change optical system output by said microscope controlling section; and wherein said controlling section;
comprises a memory in which a table of an NA and a magnification corresponding to the objective lens type is stored,
compares the objective lens type outputted from said microscope controlling section with said table to obtain the NA of the objective lens,
obtains an image forming magnification of an optical system of said microscope from the objective lens type, the image forming lens type and the zoom magnification of the intermediate magnification change optical system outputted from said microscope controlling section,
obtains the NA of a light image incident upon said electronic camera from the NA of said objective lens and the image forming magnification of said optical system by the following equation:

NA=NA of the objective lens/the image forming magnification of the optical system, obtains a resolution R (=0.5λ/NA or 0.61λ/NA: λ denoting one of the wavelengths of lights constituting the light image) of the light image from the NA,
obtains the recording pixel number as a maximum pixel pitch satisfying:

$$Ip<R2$$

when a pixel pitch of a recorded image is Ip, and sets the recording pixel number as the recording pixel number of said image recording section.

23. A microscope system in which an electronic camera is used to pick up an observation image by a microscope, comprising:

a controlling section for setting an image pickup operation of an image pickup element in said electronic camera to an optimum state in accordance with a state of at least one of an optical system combination for a projection magnification of at least an objective lens and a photo eyepiece on a microscope side, an observation method, and lighting conditions;

a microscope controlling section for controlling an operation of said microscope;

an image pickup element driving section for driving said image pickup element; and a image forming lens and an intermediate magnification change optical system;

wherein said controlling section sets a binning number of said image pickup element driving section based on an objective lens type outputted from said microscope controlling section;

wherein said controlling section sets a binning number of said image pickup element driving section based on an objective lens type, an image forming lens type and a zoom magnification of the intermediate magnification change optical system outputted from said microscope controlling section; and wherein said controlling section comprises a memory in which a table of a combination of the objective lens type, the image forming lens type and the zoom magnification of the intermediate magnification change optical system and a corresponding NA of a light image incident upon said electronic camera is stored, compares the objective lens type, the image forming lens type and the zoom magnification of the intermediate magnification change optical system outputted from said microscope controlling section with said table to obtain the NA of the light image incident upon said electronic camera, obtains a resolution R (=0.5λ/NA or 0.61λ/NA: λ denoting one of wavelengths of lights constituting the light image) of said light image from the NA, obtains the binning number as a maximum integer of 1 or more satisfying:

$$B < R/2p$$

when the binning number is B and an element pitch of said image pickup element is p, and sets the binning number as the binning number of said image pickup element driving section.

24. A microscope system in which an electronic camera is used to pick up an observation image by a microscope, comprising:

a controlling section for setting an image pickup operation of an image pickup element in said electronic camera to an optimum state in accordance with a state of at least one of an optical system combination for a projection magnification of at least an objective lens and a photo eyepiece on a microscope side, an observation method, and lighting conditions;

a microscope controlling section for controlling an operation of said microscope;

an image pickup element driving section for driving said image pickup element; and an image forming lens and an intermediate magnification change optical system;

wherein said controlling section sets a binning number of said image pickup element driving section based on an objective lens type outputted from said microscope controlling section;

wherein said controlling section sets a binning number of said image pickup element driving section based on an objection lens type, an image forming lens type and a zoom magnification of the intermediate magnification change optical system outputted from said microscope controlling section; and wherein said controlling section:

comprises a memory in which a table of an NA and a magnification corresponding to the objective lens type is stored, compares the objective lens type outputted from said microscope controlling section with said table to obtain the NA of the objective lens, obtains an image forming magnification of an optical system of said microscope from the objective lens type, the image forming lens type and the zoom magnification of the intermediate magnification change optical system outputted from said microscope controlling section, obtains the NA of a light image incident upon said electronic camera from the NA of said objective lens and the image forming magnification of said optical system by the following equation:

$NA = NA$ of the objective lens/the image forming magnification of the optical system, obtains a resolution R (=0.5λ/NA or 0.61λ/NA: λ denoting one of wavelengths of lights constituting the light image) of the light image from the NA, obtains the binning number as a maximum integer of 1 or more satisfying:

$$B < R/2p$$

when the binning number is B and an element pitch of the image pickup element is p, and sets the binning number as the binning number of said image pickup element driving section.

* * * * *